US008580877B2

(12) United States Patent
Tsou et al.

(10) Patent No.: US 8,580,877 B2
(45) Date of Patent: Nov. 12, 2013

(54) CONSTRUCTION COMPRISING TIE LAYER

(75) Inventors: Andy Haishung Tsou, Houston, TX (US); Yoshihiro Soeda, Hiratsuka (JP); Matthew Brian Measmer, Deer Park, TX (US); James Peter Stokes, Katy, TX (US); Yoshiaki Kirino, Hiratsuka (JP); Arthur Joseph Sullivan, Houston, TX (US)

(73) Assignees: ExxonMobil Chemical Patents Inc., Houston, TX (US); The Yokohama Rubber Co., Ltd., Tokyo (JP)

(*) Notice: Subject to any disclaimer, the term of this patent is extended or adjusted under 35 U.S.C. 154(b) by 908 days.

(21) Appl. No.: 12/091,608

(22) PCT Filed: Oct. 26, 2006

(86) PCT No.: PCT/US2006/060272
§ 371 (c)(1),
(2), (4) Date: Aug. 20, 2008

(87) PCT Pub. No.: WO2007/051144
PCT Pub. Date: May 3, 2007

(65) Prior Publication Data
US 2008/0314492 A1 Dec. 25, 2008

(51) Int. Cl.
*C09J 7/02* (2006.01)
(52) U.S. Cl.
USPC ........... 524/271; 152/450; 152/510; 524/270; 524/272; 524/273; 524/274; 524/380; 524/384; 524/385
(58) Field of Classification Search
USPC ........... 152/510, 450, DIG. 16; 524/270, 271, 524/272, 273, 274, 380, 384, 385
See application file for complete search history.

(56) References Cited

U.S. PATENT DOCUMENTS

| | | | | |
|---|---|---|---|---|
| 2,798,526 | A * | 7/1957 | Peterson et al. | 152/564 |
| 4,725,649 | A * | 2/1988 | Hoshino | 525/133 |
| 5,738,158 | A | 4/1998 | Ozawa et al. | |
| 6,062,283 | A | 5/2000 | Watanabe et al. | |
| 6,079,465 | A * | 6/2000 | Takeyama et al. | 152/510 |
| 6,148,889 | A * | 11/2000 | Minami et al. | 152/510 |
| 6,759,136 | B2 | 7/2004 | Kanenari et al. | |
| 2002/0066512 | A1 * | 6/2002 | Narahara et al. | 152/510 |
| 2006/0144495 | A1 * | 7/2006 | Higuchi et al. | 152/510 |

FOREIGN PATENT DOCUMENTS

| | | |
|---|---|---|
| EP | 0722850 | 7/1996 |
| EP | 01424219 | 6/2004 |
| JP | 04-073137 A | 3/1992 |
| JP | 9-314752 A | 12/1997 |
| JP | 10-002465 A | 1/1998 |
| JP | 2000238188 | 9/2000 |
| JP | 2005-219565 A | 8/2005 |
| SU | 1468775 A1 | 3/1989 |
| SU | 1572832 A1 | 6/1990 |
| WO | WO-2004081099 | 9/2004 |
| WO | WO-2004081106 | 9/2004 |
| WO | WO-2004081107 | 9/2004 |
| WO | WO-2004081108 | 9/2004 |
| WO | WO-2004081116 | 9/2004 |

OTHER PUBLICATIONS

Decision to Grant issued Jul. 21, 2009 of corresponding Russian Patent Appl No. 2008121203 and translation.
Chinese Office Action with English translation issued Mar. 19, 2012 in corresponding Chinese Patent Application No. 200680049556.2.
Rubber Chemicals Manual, Rubber Institute, Chemical Industry and Engineering Society of China, Chemical Industry Press, 1st Edition, Apr. 30, 2000, pp. 520-521.

\* cited by examiner

*Primary Examiner* — Edward Cain
(74) *Attorney, Agent, or Firm* — Novak Druce Connolly Bove + Quigg LLP

(57) ABSTRACT

A vulcanizable layered composition comprising at least two layers and at least one tie layer, wherein the first layer of the two layers is a fluid permeation prevention layer preferably comprising:
 (A) at least one thermoplastic engineering component and
 (B) at least one elastomer component;
 the second layer of the two layers comprises at least one high diene rubber and the tie layer comprises a mixture of:
 (1) at least one halogenated isobutylene containing elastomer;
 (2) up to 50 weight % of at least one high diene elastomer;
 (3) at least one filler;
 (4) up to 30 weight % of at least one processing oil;
 (5) at least one tackifier; and
 (6) a curing system for the elastomers.

14 Claims, 1 Drawing Sheet

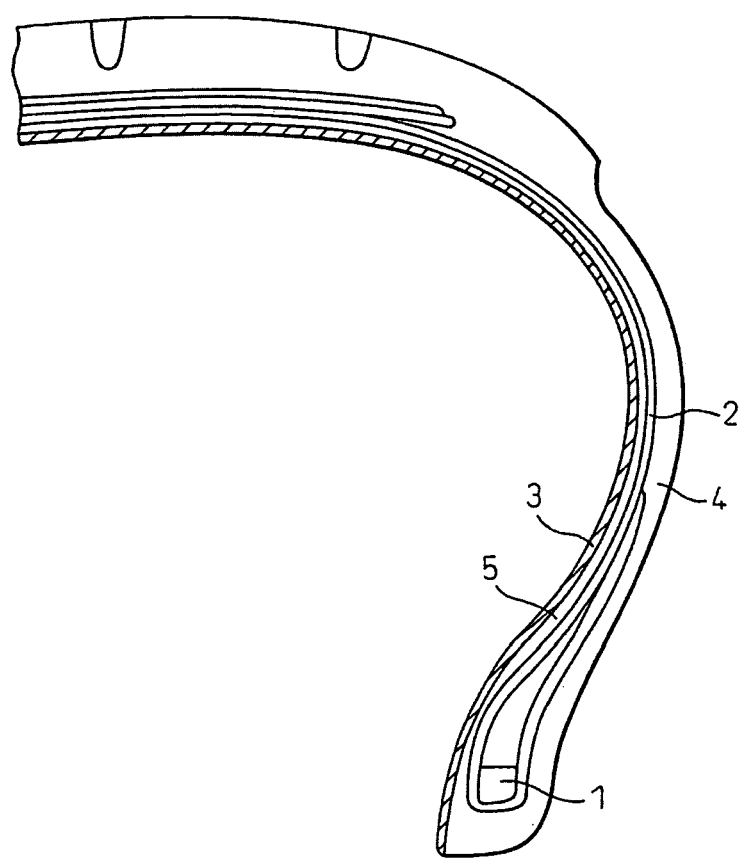

CONSTRUCTION COMPRISING TIE LAYER

CROSS-REFERENCE TO RELATED APPLICATIONS

The present application is a National Phase of PCT Application No. PCT/US2006/060272 filed Oct. 26, 2006 which claims priority to PCT/US2005/38705, filed on 27 Oct. 2005, the disclosure of which is incorporated herein by reference.

FIELD OF THE INVENTION

This invention relates to compositions useful in multilayer constructions, for example in tire construction, especially a tire tie layer between an innerliner and carcass. In particular, this invention relates to rubber compositions utilizing halogenated isobutylene-containing elastomers, optionally in blends with high diene-containing elastomer or rubber, such as natural rubber (NR) and styrene butadiene rubber (SBR).

BACKGROUND OF THE INVENTION

To prevent tire cord strike-through, a condition wherein the reinforcing tire cord penetrates the innerliner layer, leading to air leakage and tire failure, it is a common practice to add a buffer layer between the carcass layer containing textile or steel cords and the innerliner layer. This buffer layer has been referred to as tie gum, tie layer, cushion compound, or liner backing layer and typically includes blends of natural rubber (NR) and styrene-butadiene rubber (SBR). For purposes of the present invention, this tire component is referred to as the "tie layer." Typically, the composition of the tie layer is similar to the composition of the carcass compound in order to provide the necessary building tack for maintaining a coherent tire structure in the uncured, or "green," state, cured adhesion, and satisfactory dynamic properties during tire use. However, both NR and SBR are highly permeable rubbers. Consequently, a thicker cross-section would be required in order to reduce air permeability though this layer and so maintain tire pressure. In order to achieve overall weight reduction in a tire by using a thin, highly impermeable innerliner, it is necessary to find a means of reducing the cross-sectional thickness of the tie layer. The present invention provides a solution by using at least one highly impermeable isobutylene-based elastomer in combination with, for example, NR in the tie layer; particularly preferred impermeable elastomers being brominated isobutylene-paramethyl-styrene copolymers (BIMS). The present invention is useful in tires employing conventional innerliner compositions based on halogenated isobutylene-containing elastomer components as well as thermoplastic elastomeric tire innerliner compositions based on vulcanized blends of engineering resins, e.g., polyamides and BIMS, produced, for example, using dynamic vulcanization, as disclosed in EP 0 722 850 B1. Consequently, the present invention provides a tie layer suitable for joining a layer based on a dynamically vulcanized alloy of polyamide and a brominated copolymer of isobutylene-para-methylstyrene, such as an innerliner composition, to a tire carcass without impairing the improved permeability characteristics achieved by the innerliner. It is also useful in other applications in which an air or fluid holding layer is used in combination with another layer, particularly where the other layer includes reinforcing fibers or cords, e.g., hoses and other vessels required to retain a gas or a fluid.

U.S. Pat. No. 5,738,158 discloses a pneumatic tire having an air permeation prevention layer or innerliner layer composed of a thin film of a resin composition including at least 20% by weight of a thermoplastic polyester elastomer comprised of a block copolymer of polybutylene terephthalate and polyoxyalkylene diimide diacid at a weight ratio of polybutylene terephthalate/polyoxyalkylene diimide diacid of 85/15 or less. The resin composition can further include dispersed rubber particles wherein the rubber particles have been dynamically vulcanized. The concept of using a resin composition as an innerliner layer has been further developed by various inventors of the same assignee, see, e.g., U.S. Pat. No. 6,079,465, which claims a pneumatic tire that incorporates such an innerliner and discloses the use of various thermoplastic resins for use in the composition. This patent also discloses the presence of a tie layer and another layer to promote bond or adhesive strength of the innerliner layer in the overall structure. The further development of this technology to improve adhesion of the innerliner layer in the structure is described in U.S. Pat. No. 6,062,283 wherein melt viscosities and solubility parameters of thermoplastic resin components and elastomer components are controlled according to a specific mathematical formula.

Published application U.S. 2002/0066512 discloses a pneumatic tire comprising a carcass comprising a ply of cords defining the innermost reinforcing cord layer extending between bead portions, and an airtight layer disposed inside the cords of the carcass ply along the inner surface of the tire, covering the substantially entire inner surface of the tire, wherein the airtight layer is made of air-impermeable rubber including at least 10 weight % of halogenated butyl rubber and/or halogenated isobutylene-paramethyl styrene copolymer in its rubber base, and a thickness of the airtight layer measured from the inner surface of the tire to the cords of the carcass ply is in a range of from 0.2 to 0.7 mm. The publication also discloses that the "airtight layer," defined by a rubber layer between the tire inner surface and the innermost tire cords or carcass cords, can be a double layer comprising an inner layer of an air-impermeable rubber compound and an outer layer of a diene-based rubber which is not air-impermeable. Alternatively, the outer layer may be of the same air-impermeable rubber compound or a similar air-impermeable rubber compound, which compound is further described in the publication as including halogenated butyl rubber and/or halogenated isobutylene-paramethyl styrene copolymer and diene rubber as well as carbon black (see paragraphs 28-34).

Other references of interest include: WO 2004/081107, WO 2004/081106, WO 2004/081108, WO 2004/081116, WO 2004/081099, JP 2000238188, EP 01 424 219, U.S. Pat. No. 6,759,136, and U.S. Pat. No. 6,079,465.

SUMMARY OF THE INVENTION

In some embodiments, this disclosure relates to a vulcanizable layered construction comprising at least two layers and at least one tie layer, wherein the first layer of the two layers comprises a fluid (preferably air) permeation prevention layer, the second layer of the two layers comprises at least one high diene rubber, and the tie layer comprises a mixture of:
(1) about 50 to about 100 weight % of at least one halogenated isobutylene-containing elastomer;
(2) about 0 to about 50 weight % of at least one high diene elastomer;
(3) about 20 to about 50 weight % of at least one filler;
(4) about 0 to about 30 weight % of at least one processing oil;
(5) about 1 to about 20 parts per hundred (phr) of at least one tackifier; and
(6) at least about 0.1 to about 15 parts per hundred of rubber (phr) of a curing system for said elastomers;

wherein the air permeation prevention layer comprises a polymer composition having an air permeation coefficient of $25 \times 10^{-12}$ cc·cm/cm$^2$ sec cmHg (at 30° C.) or less and a Young's modulus of 1 to 500 MPa, and where the air permeation prevention layer comprises:

(A) at least 10% by weight, based on the total weight of the polymer composition, of at least one thermoplastic engineering resin component having a Young's modulus of more than 500 MPa and an air permeation coefficient of $25 \times 10^{-12}$ cc·cm/cm$^2$ sec cmHg (at 30° C.) or less, which resin component is selected from the group consisting of polyamide resins, polyester resins, polynitrile resins, polymethacrylate resins, polyvinyl resins, cellulose resins, fluororesins, and imide resins; and (B) at least 10% by weight, based on the total weight of the polymer composition, of at least one elastomer component having a Young's modulus of not more than 500 MPa and an air permeation coefficient of more than $25 \times 10^{-12}$ cc·cm/cm$^2$ sec cmHg (at 30° C.), which elastomer component is selected from the group consisting of diene rubbers and the hydrogenates thereof, halogen-containing rubbers, silicone rubbers, sulfur-containing rubbers, fluoro-rubbers, hydrin rubbers, acryl rubbers, ionomers and thermoplastic elastomers, where the total amount (A)+(B) of the component (A) and the component (B) is not less than 30% by weight based on the total weight of the polymer composition, and wherein the elastomer component (B) is dispersed in a vulcanized state or partially vulcanized state, as a discontinuous phase, in a matrix of the thermoplastic resin component (A) in the polymer composition; and wherein the amount and type of said at least one tackifier is effective to provide sufficient uncured adhesive strength to permit the building of said multilayered construction without substantial delamination of said tie layer to an adjoining layer prior to the establishment of crosslinking in an amount to provide suitable adhesion between said layers resulting in an acceptable multilayered construction.

In one such preferred aspect, this invention relates to a tire comprising a carcass, an innerliner and a tie layer between the innerliner and the carcass where the innerliner comprises a dynamically vulcanized alloy of a thermoplastic engineering resin and a halogenated copolymer of an isoolefin and a para-alkylstyrene, and the tie layer comprises a halogenated rubber, a high diene monomer rubber and at least one tackifier, more preferably a mixture of tackifier comprising a rosin and a condensate of tert-butyl phenol and acetylene. In another aspect, the invention relates to a hose comprising the improved vulcanizable layered construction.

BRIEF DESCRIPTION OF THE DRAWING

FIG. 1 is a simplified cross-sectional view of a tire showing the location of various layers in a tire including a tie layer.

DETAILED DESCRIPTION

The present invention relates to a rubber composition for a relatively impermeable tie layer between innerliner and carcass for tire weight reduction while maintaining the heat resistance, durability, and flexibility demanded for a pneumatic tire. The present invention is also directed to reducing the permeability of the tie layer with improved durability while maintaining its excellent adhesion to carcass and innerliner and/or its fatigue resistance.

As used herein, the new numbering scheme for the Periodic Table Groups is used as disclosed in CHEMICAL AND ENGINEERING NEWS, 63(5), 27 (1985). All molecular weights are weight average unless otherwise noted.

Throughout the entire specification, including the claims, the word "comprise" and variations of the word, such as "comprising" and "comprises," as well as "have," "having," "includes," "include" and "including," and variations thereof, means that the named steps, elements or materials to which it refers are essential, but other steps, elements or materials may be added and still form a construct with the scope of the claim or disclosure. When recited in describing the invention and in a claim, it means that the invention and what is claimed is considered to what follows and potentially more. These terms, particularly when applied to claims, are inclusive or open-ended and do not exclude additional, unrecited elements or methods steps.

In the present context, "consisting essentially of" is meant to exclude any element or combination of elements as well as any amount of any element or combination of elements that would alter the basic and novel characteristics of the invention. Thus, by way of example, a layered construction in which high diene rubber or other polymer or polymer combination is used to the exclusion of halogenated isobutylene-containing rubber in a tie layer and in which an air permeation prevention layer is prepared from a composition other than by dynamically vulcanizing an engineering resin-containing composition would be excluded. Similarly, and again for exemplary purposes only, a tie layer containing less than an amount of halogenated isobutylene-containing rubber which would alter the air permeability of the resulting layered structure to a level not contemplated by the invention would be excluded. Alternatively, a tie layer containing an amount of optional additive which would alter the air permeability of the resulting layer structure to a level not contemplated by the invention would be excluded. For example, a small amount of process oil, or other low molecular weight additives, to the extent that they would not significantly alter the air or fluid permeability of the layered structure or tie layer, could still be used. However, if, for example, a process oil were to be used at a level of about 40 phr or greater, properties, especially impermeability properties can be adversely altered. Thus, such an amount of additives, would be excluded.

For purposes of the present invention, unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met.

Polymer may be used to refer to homopolymers, copolymers, interpolymers, terpolymers, etc. Likewise, a copolymer may refer to a polymer comprising at least two monomers, optionally with other monomers.

When a polymer is referred to as comprising a monomer, the monomer is present in the polymer in the polymerized form of the monomer or in the derivative form the monomer. However, for ease of reference the phrase "comprising the (respective) monomer" or the like is used as shorthand. Likewise, when catalyst components are described as comprising neutral stable forms of the components, it is well understood by one skilled in the art, that the active form of the component is the form that reacts with the monomers to produce polymers.

Isoolefin refers to any olefin monomer having two substitutions on the same carbon.

Multiolefin refers to any monomer having two or more double bonds. In a preferred embodiment, the multiolefin is any monomer comprising two double bonds, preferably two conjugated double bonds such as a conjugated diene like isoprene.

Elastomer(s) as used herein, refers to any polymer or composition of polymers consistent with the ASTM D1566-06 definition. The terms may be used interchangeably with the term "rubber(s)."

Alkyl refers to a paraffinic hydrocarbon group which may be derived from an alkane by dropping one or more hydrogens from the formula, such as, for example, a methyl group ($CH_3$), or an ethyl group ($CH_3CH_2$), etc.

Aryl refers to a hydrocarbon group that forms a ring structure characteristic of aromatic compounds such as, for example, benzene, naphthalene, phenanthrene, anthracene, etc., and typically possess alternate double bonding ("unsaturation") within its structure. An aryl group is thus a group derived from an aromatic compound by dropping one or more hydrogens from the formula such as, for example, phenyl, or $C_6H_5$.

Substituted refers to at least one hydrogen group replaced by at least one substituent selected from, for example, halogen (chlorine, bromine, fluorine, or iodine), amino, nitro, sulfoxy (sulfonate or alkyl sulfonate), thiol, alkylthiol, and hydroxy; alkyl, straight or branched chain having 1 to 20 carbon atoms which includes methyl, ethyl, propyl, tert-butyl, isopropyl, isobutyl, etc.; alkoxy, straight or branched chain alkoxy having 1 to 20 carbon atoms, and includes, for example, methoxy, ethoxy, propoxy, isopropoxy, butoxy, isobutoxy, secondary butoxy, tertiary butoxy, pentyloxy, isopentyloxy, hexyloxy, heptyloxy, octyloxy, nonyloxy, and decyloxy; haloalkyl, which means straight or branched chain alkyl having 1 to 20 carbon atoms which contains at least one halogen, and includes, for example, chloromethyl, bromomethyl, fluoromethyl, iodomethyl, 2-chloroethyl, 2-bromoethyl, 2-fluoroethyl, 3-chloropropyl, 3-bromopropyl, 3-fluoropropyl, 4-chlorobutyl, 4-fluorobutyl, dichloromethyl, dibromomethyl, difluoromethyl, diiodomethyl, 2,2-dichloroethyl, 2,2-dibromomethyl, 2,2-difluoroethyl, 3,3-dichloropropyl, 3,3-difluoropropyl, 4,4-dichlorobutyl, 4,4-difluorobutyl, trichloromethyl, 4,4-difluorobutyl, trichloromethyl, trifluoromethyl, 2,2,2-trifluoroethyl, 2,3,3-trifluoropropyl, 1,1,2,2-tetrafluoroethyl, and 2,2,3,3-tetrafluoropropyl. Thus, for example, a "substituted styrenic unit" includes p-methylstyrene, p-ethylstyrene, etc.

In various preferred embodiments, the present invention is directed to a layered construction comprising at least one layer comprising an thermoplastic engineering resin (also called an "engineering resin" or a "thermoplastic resin") as a continuous phase and a vulcanized (or partially vulcanized) elastomer as a dispersed phase. Such a composition is prepared, for example by utilizing technology known as dynamic vulcanization and the resulting composition is known as a dynamically vulcanized alloy (DVA); details of such a composition and its method of preparation are described herein. The construction further comprises a layer of an elastomeric composition comprising a high diene rubber, for example, natural rubber and/or styrene butadiene rubber, further described herein. Each of these layers typically contain additional components such as reinforcing agents and process aids, for example, carbon black and/or exfoliated, intercalated, or simply dispersed clay and rubber processing oil, respectively. The high diene rubber-containing layer is typically prepared by standard rubber compounding methods, and includes curatives or a cure system so that the composition is vulcanizable. Sandwiched between the two layers is a tie layer, so named because it ties the two layers together. It too is preferably a vulcanizable composition, typically containing at least one reinforcing filler as well as optional additives such as processing aids, etc., and, for purposes of the present invention, the tie layer comprises a halogenated isobutylene-containing elastomer. The thermoplastic engineering resin layer of the present invention can comprise at least one reinforcing filler and other components such that it serves to inhibit the permeation of fluids through it. In the context of its use in pneumatic tires, it serves as a liner, typically at the innermost surface of the tire construction and is referred to in the tire industry as an innerliner. Its composition and method of preparation are designed by a rubber compounder to inhibit the passage of air or oxygen through the layer so as to maintain tire pressure over extended periods of time.

When the engineering resin-containing layer is used as a layer (typically the innermost layer) of a hose construction, it will also inhibit passage of fluids through it. Such fluids can include air, oxygen and other gases, as well as liquids such as water or industrial fluids. The nature of the fluid to be contained will dictate the selection of the components of the engineering resin-containing layer, including the choice of vulcanizable rubber used to prepare the DVA composition. Such selections are well known to compounders of ordinary skill in the hose industry.

When the engineering resin-containing layer is used as a tire innerliner, the tire innerliner composition of the present invention may be used in producing innerliners for motor vehicle tires such as truck tires, bus tires, passenger automobile, motorcycle tires, moped tires, all terrain vehicle tires, and the like. Furthermore, such a layer can be used in tires intended for non-motorized vehicles such as bicycles.

The first layer in a construction is typically a dynamically vulcanized alloy (DVA) composition as described in detail below and is typically present in the form of a sheet or a film, but may also be present in the form of a tubular layer of a hose construction.

The second layer in a construction (such as a film or sheet or tire carcass layer) is typically a composition comprising a high diene rubber. Alternatively, such second layer can be a tubular layer of a hose construction. This layer can also comprise reinforcing fibers such as tire cords, carbon black or other suitable reinforcement useful in tire applications or hose applications.

The tie layer is typically present as a sheet or film that is formed, e.g., by the use of extrusion or calendering processes.

Halogenated rubber is defined as a rubber having at least about 0.1 mole % halogen based on total moles of monomers and co-monomers, such halogen selected from the group consisting of bromine, chlorine and iodine. Preferred halogenated rubbers useful in this invention include halogenated isobutylene containing elastomers (also referred to as halogenated isobutylene-based homopolymers or copolymers). These elastomers can be described as random copolymers of a $C_4$ to $C_7$ isomonoolefin derived unit, such as isobutylene derived unit, and at least one other polymerizable unit. In one embodiment of the invention, the halogenated isobutylene-containing elastomer is a butyl-type rubber or branched butyl-type rubber, especially brominated versions of these elastomers. (Useful unsaturated butyl rubbers such as homopolymers and copolymers of olefins or isoolefins and other types of elastomers suitable for the invention are well known and are described in RUBBER TECHNOLOGY 209-581 (Maurice Morton ed., Chapman & Hall 1995), THE VANDERBILT RUBBER HANDBOOK 105-122 (Robert F. Ohm ed., R. T. Vanderbilt Co., Inc. 1990), and Edward Kresge and N. C. Wang in 8 KIRK-OTHMER ENCYCLOPEDIA OF CHEMICAL TECHNOLOGY 934-955 (John Wiley & Sons, Inc. 4th ed. 1993)). Preferred halogenated isobutylene-based homopolymers or copolymers useful in this invention include halobutyl rubbers, such as bromobutyl rubber and chlorobutyl rubber.

Butyl rubbers are typically prepared by reacting a mixture of monomers, the mixture having at least (1) a $C_4$ to $C_{12}$ isoolefin monomer component such as isobutylene with (2) a multiolefin, monomer component. The isoolefin is in a range from 70 to 99.5 wt % by weight of the total monomer mixture in one embodiment, and 85 to 99.5 wt % in another embodiment. The multiolefin component is present in the monomer mixture from 30 to 0.5 wt % in one embodiment, and from 15 to 0.5 wt % in another embodiment.

In yet another embodiment, from 8 to 0.5 wt % of the monomer mixture is multiolefin. The isoolefin is preferably a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The multiolefin is a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 0 279 456 and U.S. Pat. Nos. 5,506,316 and 5,162,425. Other polymerizable monomers such as styrene and dichlorostyrene are also suitable for homopolymerization or copolymerization in butyl rubbers. One embodiment of the butyl rubber polymer useful in the invention is obtained by reacting 95 to 99.5 wt % of isobutylene with 0.5 to 8 wt % isoprene, or from 0.5 wt % to 5.0 wt % isoprene in yet another embodiment. Butyl rubbers and methods of their production are described in detail in, for example, U.S. Pat. Nos. 2,356,128, 3,968,076, 4,474,924, 4,068,051 and 5,532,312.

Halogenated butyl rubber is produced by the halogenation of the butyl rubber product described above. Halogenation can be carried out by any means, and the invention is not herein limited by the halogenation process. Methods of halogenating polymers such as butyl polymers are disclosed in U.S. Pat. Nos. 2,631,984, 3,099,644, 4,288,575, 4,554,326, 4,632,963, 4,681,921, 4,650,831, 4,384,072, 4,513,116 and 5,681,901. In one embodiment, the butyl rubber is halogenated in hexane diluent at from 4 to 60° C. using bromine ($Br_2$) or chlorine ($Cl_2$) as the halogenation agent. Post-treated halogenated butyl rubber can also be used, as disclosed in U.S. Pat. No. 4,288,575. The halogenated butyl rubber typically has a Mooney Viscosity of about 20 to about 70 (ML 1+8 at 125° C.); for example, about 25 to about 55 in another embodiment. The halogen content is typically about 0.1 to 10 wt % based on the weight of the halogenated butyl rubber; for example, about 0.5 to 5 wt %; alternatively, about 0.8 to about 2.5 wt %; for example, about 1 to about 2 wt %.

A commercial embodiment of a halogenated isobutylene containing elastomer useful in the present invention is Bromobutyl 2222 (ExxonMobil Chemical Company). Its Mooney Viscosity is typically about 27 to 37 (ML 1+8 at 125° C., ASTM D1646-04, modified), and its bromine content is about 1.8 to 2.2 wt % relative to the Bromobutyl 2222. Furthermore, the cure characteristics of Bromobutyl 2222 as provided by the manufacturer are as follows: MH about 28 to 40 dN m, ML is about 7 to 18 dN m (ASTM D2084-92A). Another commercial embodiment of a halogenated isobutylene containing elastomer useful in the present invention is Bromobutyl 2255 (ExxonMobil Chemical Company). Its Mooney Viscosity is about 41 to 51 (ML 1+8 at 125° C., ASTM D1646-04), and its bromine content is about 1.8 to 2.2 wt %. Furthermore, its cure characteristics as disclosed by the manufacturer are as follows: MH is from 34 to 48 dN m, ML is from 11 to 21 dN m (ASTM D2084-92A).

Another useful embodiment of halogenated isobutylene containing elastomer is halogenated, branched or "star-branched" butyl rubber. These rubbers are described in, for example, EP 0 678 529 B1, U.S. Pat. No. 5,182,333 and U.S. Pat. No. 5,071,913, each incorporated herein by reference. In one embodiment, the star-branched butyl rubber ("SBB") is a composition comprising butyl rubber and a polydiene or block copolymer. For purposes of the present invention, the method of forming the SBB is not a limitation. The polydienes, block copolymer, or branching agents (hereinafter "polydienes"), are typically cationically reactive and are present during the polymerization of the butyl or halogenated butyl rubber, or can be blended with the butyl rubber to form the SBB. The branching agent or polydiene can be any suitable branching agent, and the invention is not limited to the type of polydiene or branching agent used to make the SBB.

In one embodiment, the SBB is a composition of butyl or halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber (EPDM), ethylene-propylene rubber (EPM), styrene-butadiene-styrene and styrene-isoprene-styrene block copolymers. Polydienes can be present, based on the total monomer content in wt %, typically greater than 0.3 wt %; alternatively, about 0.3 to about 3 wt %; or about 0.4 to 2.7 wt %.

Preferably the branched or "star-branched" butyl rubber used herein is halogenated. In one embodiment, the halogenated star-branched butyl rubber ("HSBB") comprises a butyl rubber, either halogenated or not, and a polydiene or block copolymer, either halogenated or not. The halogenation process is described in detail in U.S. Pat. Nos. 4,074,035, 5,071,913, 5,286,804, 5,182,333 and 6,228,978. The present invention is not limited by the method of forming the HSBB. The polydiene/block copolymer, or branching agents (hereinafter "polydienes"), are typically cationically reactive and are present during the polymerization of the butyl or halogenated butyl rubber, or can be blended with the butyl or halogenated butyl rubber to form the HSBB. The branching agent or polydiene can be any suitable branching agent, and the invention is not limited by the type of polydiene used to make the HSBB.

In one embodiment, the HSBB is typically a composition comprising halogenated butyl rubber as described above and a copolymer of a polydiene and a partially hydrogenated polydiene selected from the group consisting of styrene, polybutadiene, polyisoprene, polypiperylene, natural rubber, styrene-butadiene rubber, ethylene-propylene diene rubber, styrene-butadiene-styrene and styrene-isoprene-styrene block copolymers. Polydienes can be present, based on the total monomer content in wt %, typically greater than about 0.3 wt %, alternatively about 0.3 to 3 wt %, or about 0.4 to 2.7 wt %.

A commercial embodiment of HSBB useful in the present invention is Bromobutyl 6222 (ExxonMobil Chemical Company), having a Mooney Viscosity (ML 1+8 at 125° C., ASTM D1646-04, modified) of about 27 to 37, and a bromine content of about 2.2 to 2.6 wt %. Further, cure characteristics of Bromobutyl 6222, as disclosed by the manufacturer, are as follows: MH is from 24 to 38 dN m, ML is from 6 to 16 dN m (ASTM D2084-92A).

Preferred isoolefin/para-alkylstyrene copolymers useful in the invention herein in the tie layer or as the halogenated isobutylene containing elastomer include random copolymers comprising a $C_4$ to $C_7$ isoolefin, such as isobutylene, and a halomethylstyrene. The halomethylstyrene may be an ortho-, meta-, or para-alkyl-substituted styrene. In one embodiment, the halomethylstyrene is a p-halomethylstyrene containing at least 80%, more preferably at least 90% by weight of the para-isomer. The "halo" group can be any halogen, desirably chlorine or bromine. The copolymer may also include functionalized interpolymers wherein at least some of the alkyl substituent groups present on the styrene monomer units contain benzylic halogen or another functional group described further below. These interpolymers are herein referred to as "isoolefin copolymers comprising a halomethylstyrene" or simply "isoolefin copolymer."

Preferred isoolefin copolymers can include monomers selected from the group consisting of isobutylene or isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. Preferred isoolefin copolymers may also further comprise multiolefins, preferably a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, and other monomers such as disclosed in EP 279456 and U.S. Pat. No. 5,506,316 and U.S. Pat. No. 5,162,425. Desirable styrenic monomers in the isoolefin copolymer include styrene, methylstyrene, chlorostyrene, methoxystyrene, indene and indene derivatives, and combinations thereof.

Preferred isoolefin copolymers may be characterized as interpolymers containing the following monomer units randomly spaced along the polymer chain:

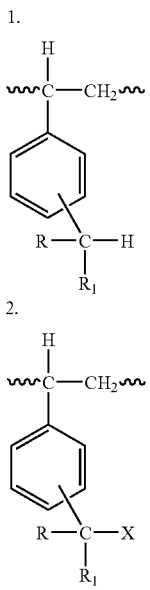

wherein R and $R^1$ are independently hydrogen, lower alkyl, preferably $C_1$ to $C_7$ alkyl and primary or secondary alkyl halides and X is a functional group such as halogen. Desirable halogens are chlorine, bromine or combinations thereof, preferably bromine. Preferably R and $R^1$ are each hydrogen. The —$CRR_1H$ and —$CRR_1X$ groups can be substituted on the styrene ring in either the ortho, meta, or para positions, preferably the para position. Up to 60 mole % of the p-substituted styrene present in the interpolymer structure may be the functionalized structure (2) above in one embodiment, and in another embodiment from 0.1 to 5 mol %. In yet another embodiment, the amount of functionalized structure (2) is from 0.4 to 1 mol %. The functional group X may be halogen or some other functional group which may be incorporated by nucleophilic substitution of benzylic halogen with other groups such as carboxylic acids; carboxy salts; carboxy esters, amides and imides; hydroxy; alkoxide; phenoxide; thiolate; thioether; xanthate; cyanide; cyanate; amino and mixtures thereof. These functionalized isomonoolefin copolymers, their method of preparation, methods of functionalization, and cure are more particularly disclosed in U.S. Pat. No. 5,162,445.

Particularly useful copolymers of isobutylene and p-methylstyrene are those containing from 0.5 to 20 mole % p-methylstyrene wherein up to 60 mole % of the methyl substituent groups present on the benzyl ring contain a bromine or chlorine atom, preferably a bromine atom (p-bromomethylstyrene), as well as acid or ester functionalized versions thereof wherein the halogen atom has been displaced by maleic anhydride or by acrylic or methacrylic acid functionality. These interpolymers are termed "halogenated poly(isobutylene-co-p-methylstyrene)" or "brominated poly(isobutylene-co-p-methylstyrene)", and are commercially available under the name EXXPRO™ Elastomers (ExxonMobil Chemical Company, Houston Tex.). It is understood that the use of the terms "halogenated" or "brominated" are not limited to the method of halogenation of the copolymer, but merely descriptive of the copolymer which comprises the isobutylene derived units, the p-methylstyrene derived units, and the p-halomethylstyrene derived units.

These functionalized polymers preferably have a substantially homogeneous compositional distribution such that at least 95% by weight of the polymer has a p-alkylstyrene content within 10% of the average p-alkylstyrene content of the polymer (as determined by and described in U.S. Pat. No. 5,162,445). More preferred polymers are also characterized by a narrow molecular weight distribution (Mw/Mn) of less than 5, more preferably less than 2.5, a preferred viscosity average molecular weight in the range of about 200,000 to about 2,000,000 and a preferred number average molecular weight in the range of about 25,000 to about 750,000 as determined by gel permeation chromatography.

Preferred halogenated poly(isobutylene-co-p-methylstyrene) polymers are brominated polymers which generally contain from about 0.1 to about 5 wt % of bromomethyl groups. In yet another embodiment, the amount of bromomethyl groups is about 0.2 to about 2.5 wt %. Expressed another way, preferred copolymers contain about 0.05 to about 2.5 mole % of bromine, based on the weight of the polymer, more preferably about 0.1 to about 1.25 mole % bromine, and are substantially free of ring halogen or halogen in the polymer backbone chain. In one embodiment of the invention, the interpolymer is a copolymer of $C_4$ to $C_7$ isomonoolefin derived units, p-methylstyrene derived units and p-halomethylstyrene derived units, wherein the p-halomethylstyrene units are present in the interpolymer from about 0.4 to about 1 mol % based on the interpolymer. In another embodiment, the p-halomethylstyrene is p-bromomethylstyrene. The Mooney Viscosity (1+8, 125° C., ASTM D1646-04, modified) is about 30 to about 60 Mooney units.

In another embodiment, the relationship between the triad fraction of an isoolefin and a p-alkylstyrene and the mol % of p-alkylstyrene incorporated into the copolymer is described by the copolymer sequence distribution equation described below and is characterized by the copolymer sequence distribution parameter, m.

$$F=1-\{mA/(1+mA)\}$$

where: m is the copolymer sequence distribution parameter,

A is the molar ratio of p-alkylstyrene to isoolefin in the copolymer and,

F is the p-alkylstyrene-isoolefin-p-alkylstyrene triad fraction in the copolymer.

The best fit or the solution of this equation yields the value of m for copolymerization of the isoolefin and p-alkylstyrene in a particular diluent. In certain embodiments, m is from less than 38; alternatively, from less than 36; alternatively, from less than 35; and alternatively, from less than 30. In other embodiments, m is from 1-38; alternatively, from 1-36; alternatively, from 1-35; and alternatively from 1-30. Copolymers having such characteristics and methods to measure such characteristics are disclosed in WO 2004058825 and WO 2004058835.

In another embodiment, the isoolefin/para-alkylstyrene copolymer is substantially free of long chain branching. For the purposes of this invention, a polymer that is substantially free of long chain branching is defined to be a polymer for which $g'_{vis.avg.}$ is determined to be greater than or equal to 0.978, alternatively, greater than or equal to 0.980, alternatively, greater than or equal to 0.985, alternatively, greater than or equal to 0.990, alternatively, greater than or equal to 0.995, alternatively, greater than or equal to 0.998, alternatively, greater than or equal to 0.999, as determined by triple detection size exclusion chromatography (SEC) as described below. Such polymers and methods to measure such characteristics are disclosed in WO 2004058825 and WO 2004058835.

In another embodiment, the relationship between the triad fraction of an isoolefin and a multiolefin and the mol % of multiolefin incorporated into the halogenated rubber copolymer is described by the copolymer sequence distribution equation below and is characterized by the copolymer sequence distribution parameter, m.

$$F = mA/(1+mA)^2$$

where: m is the copolymer sequence distribution parameter,

A is the molar ratio of multiolefin to isoolefin in the copolymer and,

F is the isoolefin-multiolefin-multiolefin triad fraction in the copolymer.

Measurement of triad fraction of an isoolefin and a multiolefin and the mol % of multiolefin incorporated into the copolymer is described below. The best fit or the solution of this equation yields the value of m for copolymerization of the isoolefin and multiolefin in each diluent. In certain embodiments, m is from greater than 1.5; alternatively, from greater than 2.0; alternatively, from greater than 2.5; alternatively, from greater than 3.0; and alternatively, from greater than 3.5. In other embodiments, m is from 1.10 to 1.25; alternatively, from 1.15 to 1.20; alternatively, from 1.15 to 1.25; and alternatively, m is about 1.20. Halogenated rubbers that have these characteristics and methods to measure such characteristics are disclosed in WO 2004058825 and WO 2004058835.

The term "best fit" as used is the regression analysis tool performing regression analysis by using the "least squares" method to fit an equation through a set of observations.

In another embodiment, the halogenated rubber is substantially free of long chain branching. For the purposes of this invention, a polymer that is substantially free of long chain branching is defined to be a polymer for which $g'_{vis.avg.}$ is determined to be greater than or equal to 0.978, alternatively, greater than or equal to 0.980, alternatively, greater than or equal to 0.985, alternatively, greater than or equal to 0.990, alternatively, greater than or equal to 0.995, alternatively, greater than or equal to 0.998, alternatively, greater than or equal to 0.999, as determined by triple detection SEC as follows. The presence or absence of long chain branching in the polymers is determined using triple detection SEC. Triple detection SEC is performed on a Waters (Milford, Mass.) 150C chromatograph operated at 40° C. equipped a Precision Detectors (Bellingham, Mass.) PD2040 light scattering detector, a Viscotek (Houston, Tex.) Model 150R viscometry detector and a Waters differential refractive index detector (integral with the 150C). The detectors are connected in series with the light scattering detector being first, the viscometry detector second and the differential refractive index detector third. Tetrahydrofuran is used as the eluent (0.5 ml/min.) with a set of three Polymer Laboratories, Ltd. (Shropshire, United Kingdom) 10 micron mixed-B/LS GPC columns. The instrument is calibrated against 16 narrow polystyrene standards (Polymer Laboratories, Ltd.). Data is acquired with TriSEC software (Viscotek) and imported into WaveMetric's Igor Pro program (Lake Oswego, Oreg.) for analysis. Linear polyisobutylene is used to establish the relationship between the intrinsic viscosity $[\eta]_{linear}$ determined by the viscometry detector) and the molecular weight ($M_w$, determined by the light scattering detector). The relationship between $[\eta]_{linear}$ and $M_w$ is expressed by the Mark-Houwink equation.

$$[\eta]_{linear} = KM_w^\alpha$$

Parameters K and α are obtained from the double-logarithmic plot of intrinsic viscosity against $M_w$, α is the slope, K the intercept. Significant deviations from the relationship established for the linear standards indicate the presence of long chain branching. Generally, samples which exhibit more significant deviation from the linear relationship contain more significant long chain branching. The scaling factor g' also indicates deviations from the determined linear relationship.

$$[\eta]_{sample} = g'[\eta]_{linear}$$

The value of g' is defined to be less than or equal to one and greater than or equal to zero. When g' is equal or nearly equal to one, the polymer is considered to be linear. When g' is significantly less than one, the sample is long chain branched. See e.g. E. F. Casassa and G. C. Berry in *Comprehensive Polymer Science*, Vol. 2, (71-120) G. Allen and J. C. Bevington, Ed., Pergamon Press, New York, 1988. In triple detection SEC, a g' is calculated for each data slice of the chromatographic curve. A viscosity average g' or $g'_{vis.avg.}$ is calculated across the entire molecular weight distribution. The scaling factor $g'_{vis.avg.}$ is calculated from the average intrinsic viscosity of the sample.

$$g'_{vis.avg.} = [\eta]_{avg.}/(KM_w^\alpha)$$

Other preferred halogenated rubbers include halogenated isobutylene-p-methylstyrene-isoprene copolymer as described in WO 01/21672A1.

The elastomer useful in the air permeation prevention layer and the halogenated isobutylene containing elastomer useful in the tie layer may be the same or different elastomer. In a preferred embodiment, the elastomer present in the air permeation prevention layer and the halogenated isobutylene containing elastomer present in the tie layer are the same elastomer. In a preferred embodiment, the elastomer present in the air permeation prevention layer and the halogenated isobutylene containing elastomer present in the tie layer are different elastomers. Likewise, the high diene elastomer present in the second layer may be the same or different high diene elastomer as the high diene elastomer present in the tie layer. In a preferred embodiment, the high diene elastomer present in the second layer is the same high diene elastomer present in the tie layer. In a preferred embodiment, the high diene elastomer present in the second layer is different from high diene elastomer present in the tie layer. By same is meant that the elastomers have comonomer and halogen content within 2 weight % of each other, respectively. By different is meant that the elastomers comprise different halogens or comonomers or that the elastomers have comonomer or halogen contents that are not within 2 weight % of each other. For example a BIMS copolymer having 3 weight % para-methyl styrene (PMS) and 5 weight % bromine is considered different from a BIMS copolymer having 11 weight % PMS and 5 weight % bromine. In a preferred embodiment, the elastomer present in the air permeation prevention layer is a brominated copolymer of isobutylene and para-methyl styrene and the halogenated isobutylene containing elastomer present in the tie layer is the same or a different brominated copolymer of isobutylene and para-methyl styrene. In another embodiment, the elastomer present in the air permeation prevention layer is a brominated copolymer of isobutylene and para-methyl styrene and the halogenated isobutylene containing elastomer present in the tie layer is a brominated butyl rubber.

For purposes of the present invention, an engineering resin (also called an "engineering thermoplastic resin," a "thermoplastic resin," or a "thermoplastic engineering resin") is defined to be any thermoplastic polymer, copolymer or mixture thereof having a Young's modulus of more than 500 MPa and, preferably, an air permeation coefficient of less than $60 \times 10^{12}$ cc cm/cm² sec cm Hg (at 30° C.), preferably less than $25 \times 10^{-12}$ cc cm/cm² sec cm Hg (at 30° C.), including, but not limited to, one or more of the following:

a) polyamide resins: nylon 6 (N6), nylon 66 (N66), nylon 46 (N46), nylon 11 (N11), nylon 12 (N12), nylon 610 (N610), nylon 612 (N612), nylon 6/66 copolymer (N6/66), nylon 6/66/610 (N6/66/610), nylon MXD6 (MXD6), nylon 6T (N6T), nylon 6/6T copolymer, nylon 66/PP copolymer, nylon 66/PPS copolymer;

b) polyester resins: polybutylene terephthalate (PBT), polyethylene terephthalate (PET), polyethylene isophthalate (PEI), PET/PEI copolymer, polyacrylate (PAR), polybutylene naphthalate (PEN), liquid crystal polyester, polyoxyalkylene diimide diacid/polybutyrate terephthalate copolymer and other aromatic polyesters;

c) polynitrile resins: polyacrylonitrile (PAN), polymethacrylonitrile, acrylonitrile-styrene copolymers (AS), methacrylonitrile-styrene copolymers, methacrylonitrile-styrene-butadiene copolymers;

d) polymethacrylate resins: polymethyl methacrylate, polyethylacrylate;

e) polyvinyl resins (for illustration, not limitation: vinyl acetate (EVA), polyvinyl alcohol (PVA), vinyl alchohol/ethylene copolymer (EVOA), polyvinylidene chloride (PVDC), polyvinyl chloride (PVC), polyvinyl/polyvinylidene copolymer, polyvinylidene chloride/methacrylate copolymer;

f) cellulose resins: cellulose acetate, cellulose acetate butyrate;

g) fluorine resins: polyvinylidene fluoride (PVDF), polyvinyl fluoride (PVF), polychlorofluoroethylene (PCTFE), tetrafluoroethylene/ethylene copolymer (ETFE);

h) polyimide resins: aromatic polyimides);

i) polysulfones;

j) polyacetals;

k) polyactones;

l) polyphenylene oxide and polyphenylene sulfide;

m) styrene-maleic anhydride;

n) aromatic polyketones; and o) mixtures of any and all of a) through n) inclusive as well as mixtures of any of the illustrative or exemplified engineering resins within each of a) through n) inclusive.

For purposes of the present invention, this definition of engineering resin excludes polymers of olefins, such as polyethylene and polypropylene.

Preferred engineering resins include polyamide resins and mixtures thereof; particularly preferred resins include Nylon 6, Nylon 66, Nylon 6 66 copolymer, Nylon 11, and Nylon 12 and their blends.

High diene content rubber or elastomer, also referred to as high diene monomer rubber, is a rubber comprising typically at least 50 mole % of a $C_4$ to $C_{12}$ diene monomer, typically at least about 60 mole % to about 100 mole %; more preferably at least about 70 mole % to about 100 mole %; more preferably at least about 80 mole % to about 100 mole %.

Useful high diene monomer rubbers include homopolymers and copolymers of olefins or isoolefins and multiolefins, or homopolymers of multiolefins. These are well known and are described in RUBBER TECHNOLOGY, 179-374 (Maurice Morton ed., Chapman & Hall 1995), and THE VANDERBILT RUBBER HANDBOOK 22-80 (Robert F. Ohm ed., R.T. Vanderbilt Co., Inc. 1990). Preferred examples of high diene monomer rubbers include polyisoprene, polybutadiene rubber, styrene-butadiene rubber, natural rubber, chloroprene rubber, acrylonitrile-butadiene rubber and the like, which may be used alone or in combination and mixtures.

Another useful group of high diene monomers rubbers includes styrenic block copolymers such as those having styrene contents of 5 wt. % to 95 wt. %, preferably 10 wt. % to 85 wt. %, more preferably 15 wt. % to 70 wt. %. Preferred styrenic block copolymers (SBC's) include those that generally comprise a thermoplastic block portion A and an elastomeric block portion B. The block portion A are the hard blocks and are derived from materials which have a sufficiently high glass transition temperature to form crystalline or glassy domains at the use temperature of the polymer. Such hard blocks generally form strong physical "crosslinks" or agglomerates with other hard blocks in the copolymers. The hard block portion, A, generally comprises a polyvinylarene derived from monomers such as styrene, alpha-methyl styrene, other styrene derivatives, or mixtures thereof. The hard block portion A may also be a copolymer derived from styrenic monomers such as those described above and olefinic monomers such as ethylene, propylene, butene, isoprene, butadiene, and mixtures thereof. Useful such polymers for the present invention typically include less than about 50% glassy phase such that the glass transition of the polymer, Tg, should be less than about −50° C.

In one embodiment, the hard block portion A is polystyrene, having a number-average molecular weight between from about 1,000 to about 200,000, preferably from about 2,000 to about 100,000, more preferably from about 5,000 to about 60,000. Typically the hard block portion A comprises from about 5% to about 80%, preferably from about 10% to about 70%, more preferably from about 10 to about 50% of the total weight of the copolymer.

The material forming the B-block preferably has a sufficiently low glass transition temperature at the use temperature of the polymer such that crystalline or glassy domains are not formed at these working temperatures. The B-block are thus typically regarded as a soft block. The soft block portion B is typically an olefinic polymer derived from conjugated aliphatic diene monomers of from about 4 to about 6 carbon atoms or linear alkene monomers of from about 2 to about 6 carbon atoms. Suitable diene monomers include butadiene, isoprene, and the like, whereas suitable alkene monomers include ethylene, propylene, butene, and the like, in each instance, mixtures are also suitable. The soft block portion B preferably comprises a substantially amorphous polyolefin such as ethylene/propylene polymers, ethylene/butene polymers, polyisoprene, polybutadiene, and the like or mixtures thereof. (By substantially amorphous is meant that the polymer has less than 25% crystallinity, preferably less than 20%, preferably less than 15%, preferably less than 10% as measured by differential scanning calorimetry.) The number-average molecular weight of the soft block B is typically from about 1,000 to about 300,000, preferably from about 10,000 to about 200,000, and more preferably from about 20,000 to about 100,000.

Typically the soft block portion B comprises from about 20% to about 90%, preferably from about 30% to about 80%, more preferably from about 40% to about 80% of the total weight of the copolymer.

Suitable SBC's for use in the compositions described herein include at least one substantially thermoplastic block portion A and at least one substantially elastomeric block portion B. The SBC's may have multiple blocks.

In one embodiment, the SEC's may be an A-B diblock copolymer. In another embodiment, the block copolymer may be an A-B-A triblock copolymer. In still other embodiments, the SBC's may be selected as A-B-A-B tetrablock copolymers, or A-B-A-B-A pentablock copolymers.

In another embodiment, the SBC's are triblock copolymers having an elastomeric midblock B and thermoplastic endblocks A and A', wherein A and A' may be derived from different vinylarene monomers. In other embodiments, the SEC's have more than one A block and/or more than one B block, wherein each A block may be derived from the same or different vinylarene monomers and each B block may be derived from the same or different olefinic monomers.

The SBC's may also be radial, having three or more arms, each arm being an B-A, B-A-B-A, or the like type copolymer and the B blocks being at or near the center portion of the radial polymer. In other embodiments, the SBC's may have four, five, or six arms.

In one embodiment, the olefinic polymer block comprises at least about 50 wt. % of the block copolymer. The unsaturation in olefinic double bonds may be selectively hydrogenated to reduce sensitivity to oxidative degradation and such hydrogenation may also have beneficial effects on the elastomeric properties. For example, a polyisoprene block can be selectively hydrogenated or reduced to form an ethylene-propylene block. In one embodiment, the vinylarene block typically comprises at least about 10 percent by weight of the SBC. However, higher vinylarene contents may be selected for high elastic and low stress relaxation properties.

Exemplary suitable SBC's for use in for inclusion in the polymeric compositions described herein are styrene-olefin-styrene triblock copolymers such as styrene-butadiene-styrene (S-B-S), styrene-ethylene/butylene-styrene (S-EB-S), styrene-ethylene/propylene-styrene (S-EP-S), styrene-isoprene-styrene (S-I-S), and mixtures thereof. The SBC may be a selected SBC or a blend of SBC's.

In one embodiment, the SBC's for use in the polymeric compositions described herein are polystyrene-ethylene/butylene-polystyrene block copolymers having a styrene content in excess of about 10 weight percent. With higher styrene content, the polystyrene block portions generally have a relatively high molecular weight.

In one embodiment, the SBC has a melt flow rate of about 0.01 to about 150 dg/min. In another embodiment, the SBC has a melt flow rate of about 0.1 to about 100 dg/min. In still another embodiment, the SBC has a melt flow rate of about 1 to about 75 dg/min (each of the melt flow rates as measured by ASTM D1238-04c, 2.16 kg and 230° C.).

In one embodiment, the composition includes an SBC comprised of triblock segments comprised of styrene-derived units and at least one other unit selected from the group consisting of ethylene-derived units, butadiene-derived units, isoprene-derived units, isobutylene-derived units and wherein the styrenic block copolymer is comprised of less than 20 wt. % of diblock segments. In another embodiment, the composition incorporates a SBC comprised of segments selected from the group consisting of SIS, SBS, SEGS, SEPS, and SIBS (styrene-isoprene-butadiene-styrene) units and wherein from about 5% to about 95% of diene units in the styrenic block copolymer are hydrogenated.

Exemplary SEC's for use in the polymeric compositions described herein are commercially available from Dexco Polymers LP under the designations Vector™ and from Kraton Polymers in Houston, Tex. under the designation Kraton™.

Generally, polymer compositions, e.g., those used to produce tires, are crosslinked in the finished tire product. Crosslinking or vulcanization is accomplished by incorporation of curing agents and/or accelerators; the overall mixture of such agents being typically referred to as a cure "system." It is known that the physical properties, performance characteristics, and durability of vulcanized rubber compounds are directly related to the number (crosslink density) and types of crosslinks formed during the vulcanization reaction. (See, e.g., Helt et al., *The Post Vulcanization Stabilization for NR*, RUBBER WORLD 18-23 (1991). Curing agents include those components described above that facilitate or influence the cure of elastomers, and generally include metals, accelerators, sulfur, peroxides, and other agents common in the art, and as described above. Crosslinking or curing agents include at least one of, e.g., sulfur, zinc oxide, and fatty acids and mixtures thereof. Peroxide-containing cure systems may also be used. Generally, polymer compositions may be crosslinked by adding curative agents, for example sulfur, metal oxides (i.e., zinc oxide, ZnO), organometallic compounds, radical initiators, etc. and heating the composition or mixture. When the method known as "dynamic vulcanization" is used, the process is modified so as to substantially simultaneously mix and vulcanize, or crosslink, at least one of the vulcanizable components in a composition comprising at least one vulcanizable rubber, elastomer or polymer and at least one elastomer or polymer not vulcanizable using the vulcanizing agent(s) for the at least one vulcanizable component. (See, e.g., U.S. Pat. No. 6,079,465 and the references cited therein). In particular, the following are common curatives that can function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., the stearate salts of Zn, Ca, Mg, and Al), or with stearic acid, and either a sulfur compound or an alkylperoxide compound. (See also, *Formulation Design and Curing Characteristics of NBR Mixes for Seals*, RUBBER WORLD 25-30 (1993). To the curative agent(s) there are often added accelerators for the vulcanization of elastomer compositions. The curing agent(s), with or without the use of at least one accelerator, is often referred to in the art as a curing "system" for the elastomer(s). A cure system is used because typically more than one curing agent is employed for beneficial effects, particularly where a mixture of high diene rubber and a less reactive elastomer is used.

For purposes of dynamic vulcanization in the presence of an engineering resin to form the highly impermeable layer, any conventional curative system which is capable of vulcanizing saturated halogenated polymers may be used to vulcanize at least the elastomeric halogenated copolymer of a $C_4$ to $C_7$ isomonoolefin and a para-alkylstyrene, except that peroxide curatives are specifically excluded from the practice of this invention when the thermoplastic engineering resin(s) chosen are such that peroxide would cause these resins themselves to crosslink since the engineering resin would itself vulcanize or crosslink, thereby resulting in an excessively cured, non-thermoplastic composition. Suitable curative systems for the elastomeric halogenated copolymer component of the present invention include zinc oxide in combination with zinc stearate or stearic acid and, optionally, one or more of the following accelerators or vulcanizing agents: Permalux, the di-ortho-tolylguanidine salt of dicatechol borate; HVA-2 (m-phenylene bis maleimide); Zisnet, 2,4,6-trimercapto-5-triazine; ZDEDC (zinc diethyl dithiocarbamate) and also including for the purposes of the present invention, other dithiocarbamates; Tetrone A (dipentamethylene thiuram hexasulfide); Vultac 5 (alkylated phenol disulfide), SP1045 (phenol formaldehyde resin); SP1056 (brominated alkyl phenol formaldehyde resin); DPPD (diphenyl phenylene diamine); salicylic acid, ortho-hydroxy benzoic acid; wood rosin, abietic acid; and TMTDS (tetramethyl thiuram disulfide), used in combination with sulfur.

Dynamic vulcanization is conducted at conditions to vulcanize at least partially, preferably fully, the elastomeric halogencontaining copolymer of the fluid (gas or liquid, preferably air) permeation prevention layer.

With reference to the polymers and/or elastomers referred to herein, the terms "cured," "vulcanized," or "crosslinked" refer to the chemical reaction comprising forming bonds as, for example, during chain extension, or crosslinks between polymer chains comprising the polymer or elastomer to the extent that the elastomer undergoing such a process can provide the necessary functional properties resulting from the curing reaction when the tire is put to use. For purposes of the present invention, absolute completion of such curing reactions is not required for the elastomer-containing composition to be considered "cured," "vulcanized" or "crosslinked." For example, for purposes of the present invention, a tire comprising the tie layer is sufficiently cured when the tire of which it is a component passes the necessary product specification tests during and after manufacturing and performs satisfactorily when used on a vehicle. Furthermore, the composition is satisfactorily, sufficiently or substantially cured, vulcanized or crosslinked when the tire can be put to use even if additional curing time could produce additional crosslinks. With limited experimentation using known tools and standard techniques, one of ordinary skill in the art can readily determine the appropriate or optimum cure time required for the elastomer(s) and polymer(s) selected for use in the tie layer composition, as well as the amount and type of crosslinking agent(s) and accelerator(s) and the curing temperature that will be used to manufacture the tire.

Accelerators useful herein include amines, guanidines, thioureas, thiazoles, thiurams, sulfenamides, sulfenimides, thiocarbamates, xanthates, and the like. Acceleration of the cure process may be accomplished by adding to the composition an amount of the accelerant. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), tetrabutylthiuram disulfide (TBTD), 2,2'-benzothiazyl disulfide (METS), hexamethylene-1,6-bisthiosulfate disodium salt dihydrate, 2-(morpholinothio) benzothiazole (MBS or MOR), compositions of 90% MOR and 10% MBTS (MOR 90), N-tertiary-butyl-2-benzothiazole sulfenamide (TBBS), and N-oxydiethylene thiocarbamyl-N-oxydiethylene sulfonamide (OTOS), zinc 2-ethyl hexanoate (ZEH), N,N'-diethyl thiourea. Curatives, accelerators and cure systems useful with one or more crosslinkable polymers are well-known in the art.

In one embodiment of the invention, at least one curing agent is typically present at about 0.1 to about 15 phr; alternatively at about 0.5 to about 10 phr.

The composition described herein may have one or more filler components such as calcium carbonate, clay, mica, silica and silicates, talc, titanium dioxide, starch and other organic fillers such as wood flour, and carbon black. Suitable filler materials include carbon black such as channel black, furnace black, thermal black, acetylene black, lamp black and the like. Reinforcing grade carbon black is most preferred. The filler may also include other reinforcing or non-reinforcing materials such as silica, clay, calcium carbonate, talc, titanium dioxide and the like. The filler is normally present in the composition (preferably the innerliner) at a level of from about 20 to about 50% by weight of the total composition, more preferably from about 25 to 40% by weight. In one embodiment, the filler is carbon black or modified carbon black. A preferred filler is semi-reinforcing grade carbon black, typically used at a level of about 10 to 150 parts per hundred of rubber, by weight (phr), more preferably about 30 to about 120 phr. Grades of carbon black useful herein include N110 to N990, as described in RUBBER TECHNOLOGY 59-85 (1995). More desirably, grades of carbon black useful in, for example, tire treads, such as N229, N351, N339, N220, N234 and N110 provided in ASTM (D3037, D1510, and D3765) are useful herein. Embodiments of carbon black useful in, for example, tire sidewalls such as N330, N351, N550, N650, N660, and N762 are particularly useful herein. Embodiments of carbon black useful in, for example, innerliners or innertubes, such as N550, N650, N660, N762, N990, and Regal 85 (Cabot Corporation, Alpharetta, Ga.) and the like are similarly particularly useful herein.

Exfoliated, intercalated, or dispersed clays may also be present in the composition. These clays, also referred to as "nanoclays", are well known, and their identity, methods of preparation and blending with polymers is disclosed in, for example, JP 2000109635, JP 2000109605, JP 11310643; DE 19726278; WO98/53000; and U.S. Pat. Nos. 5,091,462, 4,431,755, 4,472,538, and 5,910,523. Swellable layered clay materials suitable for the purposes of the present invention include natural or synthetic phyllosilicates, particularly smectic clays such as montmorillonite, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays generally comprise particles containing a plurality of silicate platelets having a thickness typically about 4 to about 20 Å in one embodiment, and about 8 to about 12 Å in another embodiment, bound together and containing exchangeable cations such as $Na^+$, $Ca^{+2}$, $K^+$ or $Mg^{+2}$ present at the interlayer surfaces.

Layered clay may be intercalated and exfoliated by treatment with organic molecules (swelling agents) capable of undergoing ion exchange reactions with the cations present at the interlayer surfaces of the layered silicate. Suitable swelling agents include cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides. Desirable amine compounds (or the corresponding ammonium ion) are those with the structure $R_1R_2R_3N$, wherein $R_1$, $R_2$, and $R_3$ are $C_1$ to $C_{30}$ alkyls or alkenes which may be the same or different. In one embodiment, the exfoliating agent is a so-called long chain tertiary amine, wherein at least $R_1$ is a $C_{12}$ to $C_{20}$ alkyl or alkene.

Another class of swelling agents includes those which can be covalently bonded to the interlayer surfaces. These include polysilanes of the structure —Si(R')$_2$R$^2$ where R' is the same or different at each occurrence and is selected from alkyl, alkoxy or oxysilane and R$^2$ is an organic radical compatible with the matrix polymer of the composite. Other suitable swelling agents include protonated amino acids and salts thereof containing 2-30 carbon atoms such as 12-aminododecanoic acid, epsilon-caprolactam and like materials. Suitable swelling agents and processes for intercalating layered silicates are disclosed in U.S. Pat. Nos. 4,472,538, 4,810,734, 4,889,885 and WO92/02582.

In a preferred embodiment of the invention, the exfoliating or swelling agent is combined with a halogenated polymer. In one embodiment, the agent includes all primary, secondary and tertiary amines and phosphines; alkyl and aryl sulfides and thiols; and their polyfunctional versions. Desirable additives include: long-chain tertiary amines such as N,N-dimethyl-octadecylamine, N,N-dioctadecyl-methylamine, dihydrogenated tallowalkyl-methylamine and the like, and amine-terminated polytetrahydrofuran; long-chain thiol and thiosulfate compounds such as hexamethylene sodium thiosulfate. In another embodiment of the invention, improved interpolymer impermeability is achieved by the use of polyfunctional curatives such as hexamethylene bis(sodium thiosulfate) and hexamethylene bis(cinnamaldehyde).

The amount of exfoliated, intercalated, or dispersed clay incorporated in the composition in accordance with this invention is an amount sufficient to develop an improvement in the mechanical properties or barrier properties of the composition, e.g. tensile strength or air/oxygen permeability. Amounts typically can be from about 0.5 to about 15 wt % in one embodiment, or about 1 to about 10 wt % in another embodiment, and about 1 to about 5 wt % in yet another embodiment, based on the polymer content of the composition. Expressed in parts per hundred rubber, the exfoliated, intercalated, or dispersed clay may be present at about 1 to about 30 phr in one embodiment, and about 3 to about 20 phr in another embodiment. In one embodiment, the exfoliating clay is an alkylamine-exfoliating clay.

As used herein, the term "process oil" means both the petroleum derived process oils and synthetic plasticizers. A process or plasticizer oil may be present in air barrier compositions. Such oils are primarily used to improve the processing of the composition during preparation of the layer, e.g., mixing, calendaring, etc. Suitable plasticizer oils include aliphatic acid esters or hydrocarbon plasticizer oils such as paraffinic or naphthenic petroleum oils. The preferred plasticizer oil for use in standard, non-DVA, non-engineering resin-containing innerliner compositions is a paraffinic petroleum oil; suitable hydrocarbon plasticizer oils for use in such innerliners include oils having the following general characteristics.

| Property | Preferred | Minimum | Maximum |
|---|---|---|---|
| API gravity at 60° F. (15.5° C.) | 15-30 | 10 | 35 |
| Flash Point, (open cup method) ° F. (° C.) | 330-450 (165-232° C.) | 300 (148° C.) | 700 (371° C.) |
| Pour Point, ° F. (° C.) | 30 to +30 (−34 to −1° C.) | −35 (−37° C.) | 60 (15° C.) |

Generally, the process oil may be selected from paraffinic oils, aromatic oils, naphthenic oils, and polybutene oils. Polybutene process oil is a low molecular weight (less than 15,000 Mn) homopolymer or copolymer of olefin-derived units having from about 3 to about 8 carbon atoms, more preferably about 4 to about 6 carbon atoms. In another embodiment, the polybutene oil is a homopolymer or copolymer of a $C_4$ raffinate. Low molecular weight "polybutene" polymers are described in, for example, SYNTHETIC LUBRICANTS AND HIGH-PERFORMANCE FUNCTIONAL FLUIDS 357-392 (Leslie R. Rudnick & Ronald L. Shubkin, ed., Marcel Dekker 1999) (hereinafter "polybutene processing oil" or "polybutene"). Useful examples of polybutene oils are the PARAPOL™ series of processing oils (previously available form ExxonMobil Chemical Company, Houston Tex., now available from Infineum International Limited, Milton Hill, England under the "INFINEUM c, d, f or g tradename), including grades previously identified as PARAPOL™ 450, 700, 950, 1300, 2400, and 2500. Additionally preferred polybutene oils are SUNTEX™ polybutene oils available from Sun Chemicals. Preferred polybutene processing oils are typically synthetic liquid polybutenes having a certain molecular weight, preferably from about 420 Mn to about 2700 Mn. The molecular weight distribution -Mw/Mn- ("MWD") of preferred polybutene oils is typically about from 1.8 to about 3, preferably about 2 to about 2.8. The preferred density (g/ml) of useful polybutene processing oils varies from about 0.85 to about 0.91. The bromine number (CG/G) for preferred polybutene oils ranges from about 40 for the 450 Mn process oil, to about 8 for the 2700 Mn process oil.

Rubber process oils also have ASTM designations depending on whether they fall into the class of paraffinic, naphthenic or aromatic hydrocarbonaceous process oils. The type of process oil utilized will be that customarily used in conjunction with a type of elastomer component and a rubber chemist of ordinary skill in the art will recognize which type of oil should be utilized with a particular rubber in a particular application. For an innerliner composition the oil is typically present at a level of 0 to about 25 wt %; preferably about 5 to 20 wt % of the total composition.

In addition, plasticizers such as organic esters and other synthetic plasticizers can be used. A particularly preferred plasticizer for use in a DVA composition is N-butylsulfonamide or other plasticizers suitable for polyamides. In another embodiment, rubber process oils such as naphthenic, aromatic or paraffinic extender oils may be present at about 1 to about 5 phr. In still another embodiment, naphthenic, aliphatic, paraffinic and other aromatic oils are substantially absent from the composition. By "substantially absent", it is meant that naphthenic, aliphatic, paraffinic and other aromatic oils may be present, if at all, to an extent no greater than 1 phr in the composition. In still another embodiment, naphthenic, aliphatic, paraffinic and other aromatic oils are present at less than 2 phr.

The term "dynamic vulcanization" is used herein to denote a vulcanization process in which the engineering resin and the rubber are mixed under conditions of high shear and elevated temperature in the presence of a curing agent. As a result, the rubber is simultaneously crosslinked and dispersed as fine particles, for example, in the form of a microgel, within the engineering resin which forms a continuous matrix; the resulting composition is known in the art as a "dynamically vulcanized alloy" or DVA. Dynamic vulcanization is effected by mixing the ingredients at a temperature which is at or above the curing temperature of the rubber using in the equipment such as roll mills, Banbury® mixers, continuous mixers, kneaders, or mixing extruders (such as twin screw extruders).

The unique characteristic of the dynamically cured composition is that, notwithstanding the fact that the rubber is cured, the composition can be processed and reprocessed by conventional thermoplastic processing techniques such as extrusion, injection molding, compression molding, etc. Scrap and or flashing can also be salvaged and reprocessed.

The dynamic vulcanization process is conducted at conditions to vulcanize at least partially, preferably fully, the elastomeric halogen-containing copolymer. To accomplish this, the thermoplastic engineering resin, the elastomeric copolymer and optional other polymers, are mixed together at a temperature sufficient to soften the resin or, more commonly, at a temperature above the melting point of a crystalline or semi-crystalline resin. Preferably the cure system is premixed in the elastomer component. Heating and masticating at vulcanization temperatures are generally adequate to complete vulcanization in about 0.5 to about 10 minutes. The vulcanization time can be reduced by elevating the temperature of vulcanization. A suitable range of vulcanization temperatures is typically from about the melting point of the thermoplastic resin to about 300° C.; for example, the temperature may range from about the melting point of the matrix resin to about 275° C. Preferably the vulcanization is carried out at a temperature range from about 10° C. to about 50° C. above the melting temperature of the matrix resin.

It is preferred that the mixing process be continued until the desired level of vulcanization or crosslinking is completed. If vulcanization is permitted to continue after mixing has stopped, the composition may not be reprocessable as a thermoplastic. However, dynamic vulcanization can be carried out in stages. For example, vulcanization can be commenced in a twin screw extruder and pellets formed of the DVA material or material using an underwater pelletizer, thereby quenching the vulcanization before it is completed. The vulcanization process can be completed at a later time under dynamic vulcanization conditions. Those of ordinary skill in the art will appreciate the appropriate quantities, types of curatives and extent of mixing time required to carry out the vulcanization of the rubber. Where necessary or desirable to establish the appropriate concentrations and conditions, the rubber alone can be vulcanized using varying amounts of curative, which may include one or more curatives and/or accelerators, to determine the optimum cure system to be utilized and the appropriate cure conditions to achieve a substantially full cure.

While it is preferred that all components be present in the mixture prior to carrying out the dynamic vulcanization process, this is not a necessary condition. For example, in one embodiment, the elastomer to be cured can be dynamically vulcanized in the presence of a portion or all of the thermoplastic engineering resin. This blend can then be let down, or dispersed under suitable conditions into additional thermoplastic engineering resin. Similarly, it is not necessary to add all of the fillers and oil, when used, prior to the dynamic vulcanization stage. A portion or all of the fillers and oil can be added after the vulcanization is completed. Certain ingredients, such as stabilizers and process aids function more effectively if they are added after curing.

The degree of cure of the vulcanized rubber can be described in terms of gel content, cross-link density, the amount of extractable components or it can be based on the state of cure that would be achieved in the rubber were it to be cured in the absence of the resin. For example, in the present invention, it is preferred that the halogenated elastomer achieve about 50 to about 85% of full cure based on the elastomer per se as measured, e.g., by tensile strength or using the oscillating disc cure meter test (ASTM D2084-01 Standard Test Method for Rubber Property-Vulcanization Using Oscillating Disk Cure Meter).

Typically, the vulcanizable tie layer composition comprises a mixture of: (1) about 50 to about 100 weight % of at least one halogenated isobutylene-containing elastomer; (2) about 0 to about 50 weight % of at least one high diene elastomer; (3) about 20 to about 50 weight % of at least one filler; (4) about 0 to about 30 weight % of at least one processing oil; and (5) at least about 0.1 to about 15 parts per hundred of rubber (phr) of a curing system for the elastomers. In a preferred embodiment the halogenated isobutylene-containing elastomer is (i) a halogen-containing random copolymer of a $C_4$ to $C_7$ isomonoolefin and a para-alkylstyrene, wherein the para-alkylstyrene comprises about 0.5 to about 20 weight percent of said copolymer or (ii) a halogen-containing random copolymer of a $C_4$ to $C_{12}$ isomonoolefin and a $C_4$ to $C_{14}$ multiolefin. In each instance, the halogen is selected from the group consisting of chlorine, bromine and mixtures thereof. Where the halogenated isobutylene-containing elastomer is a halogen-containing random copolymer of a $C_4$ to $C_{12}$ isomonoolefin and a $C_4$ to $C_{14}$ multiolefin, it is preferably selected from the group consisting of chlorinated butyl rubber, brominated butyl rubber, chlorinated star branched butyl rubber, brominated star branched butyl rubber, chlorinated high triad fraction butyl rubber, brominated high triad fraction butyl rubber, chlorinated butyl rubber substantially free of long chain branching, brominated butyl rubber substantially free of long chain branching and mixtures thereof. The amount of the at least one halogenated isobutylene-containing elastomer present in the composition is typically about 50 to about 100 weight %; preferably about 55 to about 95 weight %; more preferably about 60 to about 90 weight %, based upon the weight of the elastomers present.

The high diene elastomer is preferably a natural or synthetic rubber comprising at least 50 mole % of diene monomer and selected from the group consisting of polyisoprene, polybutadiene, poly(styrene-co-butadiene), poly(styrene-butadiene-styrene) block copolymer, natural rubber and mixtures thereof. The amount of the at least one high diene elastomer present in the composition is typically about 0 to about 50 weight %; preferably about 5 to about 45 weight %; more preferably about 10 to about 40 weight %, based upon the weight of the elastomers in the composition. As indicated, the high diene rubber component is optional, but is typically used, in part due to the improvement in building tack that it may contribute, particularly for manufacturing pneumatic tires.

Fillers useful in the tie layer include at least one filler is selected from the group consisting of carbon black, clay, exfoliated clay, intercalated clay, dispersed clay, calcium carbonate, mica, silica, silicates, talc, titanium dioxide, wood flour and mixtures thereof. Preferably, the filler is selected from the group consisting of carbon black, exfoliated clay, intercalated clay, and dispersed clay, and mixtures thereof. The amount of the at least one filler is typically about 20 to about 50 weight %; preferably about 25 to about 40 weight %; based on the total weight of the tie layer composition.

The tie layer optionally includes a rubber process or plasticizer oil selected from those described hereinabove. Suitable plasticizer oils include aliphatic acid esters or hydrocarbon plasticizer oils such as paraffinic or naphthenic petroleum oils or polybutene oils. The amount of the rubber process oil or plasticizer oil is typically about 0 to about 30 weight %; preferably about 0 to about 20 weight %; more preferably about 0 to about 10 weight %, based on the total weight of the tie layer composition. Preferably the process oil is a naphthenic or polybutene type oil; most preferably a polybutene oil.

The tie layer is cured or vulcanized using a cure system comprising at least one curing agent and at least one accelerator useful for the halogenated isobutylene-containing elastomers and high diene elastomers comprising the composition. Such curing agents and accelerators are described above and can also be found in standard reference texts of materials useful for compounding rubber. See, for example, "Blue Book 2000 (and later editions), materials, compounding ingredients, machinery and services for rubber," D. R. Smith ed., 2000, Lippincott & Peto Inc. Publication. Typically the cure system is present in the amount of at least about 0.1 to about 15 parts per hundred of rubber (phr), although, as one of ordinary skill in the art will know, the specific amount of the cure system is not limited and the amount used will depend, in large measure, on the particular components of the cure system selected.

Further optional, useful additives are typically added at a level of less than about 10 phr and can be selected from the group consisting of pigments, antioxidants, antiozonants, processing aids, compound compatibilizers, and the like and mixtures thereof. Such optional additives can be included at the discretion of the compounder in order to achieve a particular advantage in the composition, e.g., the use of a tackifier to improve contact adhesion during tire building or an antioxidant to improve heat aging characteristics of the cured composition.

In a preferred embodiment at least one tackifier is included in the tie layer composition. For purposes of the present invention, a tackifier includes materials identified as rosins or rosin derivatives as well as various derivatives such as acetylene-phenolic compounds that are known as tackifiers for elastomer or polymer containing compositions. Particularly useful tackifiers include condensation products of butyl phenol and acetylene, such as acetylene-p-tert-butyl phenol, available commercially as "Koresin" (BASF) and rosin tackifier available commercially as "MR1085A" (Mobile Rosin Oil Company, Mobile, Ala.), a blend of tall oil rosin and fatty acids. Tackifiers useful in elastomer compounds and the rubber compounding industry in general are listed and described, for example, in the "Blue Book 2000," D. R. Smith, Ed., pages 245-253 (Lippincott & Peto Inc., 2000). Some tackifiers are designated as particularly useful for imparting tack to specific polymers or elastomers, but it may be determined that they are also useful for compounds of the present invention. Tackiness generally refers to the ability of an uncured rubber compound to stick to itself or to another compound when the compounds are contacted using a relatively short dwell time and only a moderate amount of pressure (Rubber Technology: Compounding and Testing for Performance," J. S. Dick, Ed., 42, 2001). The dwell time and pressure are often determined by the equipment used for that purpose and by the potential for a sheet of the uncured composition to be damaged by excessive pressure and dwell time. Tack can also be affected by the solubility of the various rubber components in one another as well as in the overall composition. In some instances, a component of the composition may diffuse to the surface of a calendered or extruded sheet or film and either interfere with tack, for example, if it is an inorganic particulate (sometime referred to as "bloom"). On the other hand such diffusion may improve tack, for example, if the diffusing component is a one that itself exhibits tack. It is appreciated by those skilled in the art that tack is a difficult property to measure and, at times one skilled in the art may be required to determine if a composition has achieved a sufficient level of tack by evaluating performance of the composition(s) in a factory trial or environment in which the end product is produced. In the present case, that will typically involve actual tire building and a determination of whether the tie layer exhibits sufficient tire building tack so that the uncured tire construction will hold together during the tire building stage and during initial stages inflation during vulcanization until the structure achieves a sufficient level of cure and, consequently, cured adhesion of the various tire layers to one another; including adhesion of the tie layer to those layers that with which it is in proximate contact, including, for example, the carcass layer and the innerliner layer. There are no standardized test procedures for measuring tack of rubber compounds, but a widely used instrument is the "Tel-Tak Tackmeter," introduced by Monsanto in 1969. Another test instrument is the PICMA tack tester made by Toyo Seiki Seisakusho (Japan). In a preferred embodiment of the present invention, at least one tackifier is added to the tie layer composition at a concentration of about 1 phr to about 20 phr; preferably about 2 phr to about 18 phr; more preferably about 3 phr to about 16 phr; for example, about 4 phr to about 14 phr. Alternatively, the at least one tackifier is typically used at a level of about 15 phr or less; preferably about 12 phr or less; more preferably about 10 phr or less; still more preferably about 9 phr or less; most preferably about 8 phr or less; such as, for example, about 1 phr to about 10 phr; about 1 phr to about 9 phr; about 2 phr to about 9 phr; about 2 phr to about 8 phr; about 2 phr to about 7 phr and the like, including individual values and ranges including each of the values, in phr, of about 1, 2, 3, 4, 5, 6, 7, 8, 9, and 10. Similarly, where a mixture of tackifiers is used, such as for example two tackifiers of the same or different chemical type, each of the tackifiers can be present in equal amounts or in amounts that are not equal, the total amount of tackifier used preferably constrained by the total amounts recited immediately above.

The tie layer composition can be prepared using mixing equipment such as Banbury mixers, mill roll mixers, extruder mixers and the like, individually and in combination in order to mix the elastomers, filler(s), processing oil and other additives as well as to disperse the cure system components. Typically the ingredients other than the cure system components are mixed at elevated temperature and high shear to obtain satisfactory dispersion of all non-elastomeric components into the elastomers and of the elastomers in one another. After such a mixing step, the composition absent the cure system components, sometimes referred to as a masterbatch, is cooled to a lower temperature using, e.g., a rubber mill or a lower temperature, lower shear section of a mixing extruder or an internal mixer and the cure system components are dispersed into the masterbatch. The temperature for mixing curatives is typically less than about 120° C., preferably less than about 100° C.

The vulcanizable tie layer composition can be formed into a layer suitable for the end use application, using, for example, an extruder or a calender. Where convenient or useful, extrusion can include the use of equipment allowing for the dual or multiple extrusion of the fluid (preferably air) permeation prevention layer, the tie layer and the outside, high diene rubber layer. In a preferred embodiment, the tie layer is prepared for use in a tire construction and has a thickness that is typically about 5 mm or less; preferably about 2.5 mm or less; more preferably about 1.0 mm or less, about 0.9 mm or less, or about 0.8 mm or less; even more preferably about 0.2 to about 2.0 mm; most preferably about 0.2 to about 1.5 mm or about 0.2 mm to about 0.8 mm; for example about 0.3 to about 0.9 mm. The thickness of the tie layer for use in a hose construction can be the same or different depending on the application in which the hose will be employed. For example, an unreinforced, low pressure hose can have different performance requirements than a high pressure, reinforced hose and, similarly, a hose intended for use with a liquid can differ from one for use with a gas. Adjustment of the thickness is within the skill of the product designer, engineer or chemist, based, if necessary, on limited experimentation.

In addition to, the required tie layer and fluid (preferably air) permeation prevention layer, the latter typically referred to as an innerliner in a pneumatic tire, the present invention allows for the presence of additional layers that may serve a useful function. One such layer is an adhesive layer that, in a pneumatic tire for example, is typically situated between the innerliner layer and the tie layer. The adhesive layer can be included in order to further improve adhesion between the innerliner Layer, the latter typically comprising an engineering resin as a continuous phase and a dynamically vulcanized rubber as a dispersed phase, and the tie layer. When present, the adhesive layer is typically about 1 micron to about 100 microns in thickness; preferably about 5 microns to about 50 microns; or about 10 microns to about 40 microns; for example, about 20 microns to about 35 microns or about 25 microns. The adhesive layer is conveniently formed by co-extrusion with the innerliner layer so that the two layers can then be contacted with the tie layer. Alternatively, the adhesive layer can be independently prepared, stored between release sheets and used as needed. The adhesive layer typically comprises at least one polymer, copolymer, chemically modified polymers or copolymers and mixtures thereof as well as other additives commonly employed in adhesive compositions. Typical components useful in adhesive compositions include one or more tackifier, curatives, an elastomer component that is co-vulcanizable with diene rubbers, an elastomer component that is co-vulcanizable with nylon or other thermoplastic matrix employed with the innerliner composition, and others well-known to those skilled in the art of rubber, and particularly tire, compounding. Particularly useful polymers include styrene butadiene styrene copolymers (SBS) and epoxidized SBS such as Epofriend brand series of copolymers from Daicel Chemical. The adhesive composition can be prepared as described, for example, in WO 96/34736, incorporated herein by reference in its entirety.

In a more preferred embodiment, an adhesive layer is not used so that there additional weight savings to be realized in the tire construction. Instead, the tie layer composition is formulated so that it includes at least one tackifier component that provides a suitable level of tackiness for tire building and further that the resulting tie layer exhibits sufficient cured or vulcanized adhesion to the components with which it has contact so that the tire construction performs acceptably in use.

Mixing of the components may be carried out by combining the polymer components and, when the filler is clay, the clay in the form of an intercalate in any suitable mixing device such as a Banbury™ mixer, Brabender™ mixer (for laboratory mixing) or preferably a mixer/extruder. Mixing is performed typically at temperatures equal to or greater than about the softening point of the elastomer and/or secondary elastomer or rubber used in the composition; for example, about 80° C. up to about 300° C. in another embodiment, and from 120° C. to about 250° C. in yet another embodiment, under conditions of shear sufficient to allow the clay intercalate to exfoliate and become uniformly dispersed within the polymer to form a nanocomposite. When preparing a composition that is not dynamically vulcanized, typically, about 70% to about 100% of the elastomer or elastomers is first mixed for about 20 to about 90 seconds, or until the temperature reaches about 40 to about 60° C. Then, the filler, and the remaining amount of elastomer, if any, is typically added to the mixer, and mixing continues until the temperature reaches about 90° C. to about 150° C. The finished mixture is then sheeted on an open mill and allowed to cool to about 60° C. to about 100° C. at which time the cure system or curatives are added. Alternatively, the cure system can be mixed in an internal mixer of mixing extruder provided that suitable care is exercised to control the temperature.

Mixing with clays is performed by techniques known to those skilled in the art, wherein clay is added to the polymer(s) at the same time as the carbon black in one embodiment. The processing oil is typically added later in the mixing cycle after the carbon black and clay have achieved adequate dispersion in the elastomeric or polymer matrix.

The cured compositions of the invention can include various elastomers and fillers with the processing oil. The compositions of the invention typically include isobutylene-based elastomers such as halogenated poly(isobutylene-co-p-methylstyrene), halogenated butyl rubber, or halogenated star-branched butyl rubber (HSBB) either alone, or some combination with one another, with the processing oil being present typically at about 5 to about 25 phr in one embodiment.

In one embodiment, the composition comprises halogenated poly(isobutylene-co-p-methylstyrene) at about 50 to about 100 phr, optionally including natural rubber at about 5 to about 50 phr, and processing oil, e.g., polybutene, at about 5 to about 30 phr, a filler such as a carbon black about 20 to about 80 phr, and an exfoliating clay about 0.5 to about 20 phr in one embodiment, and about 2 to about 15 phr in another embodiment. The cure agents such as phenolic resins, sulfur, stearic acid, and zinc oxide, may be present individually or in combination at about 0.1 to about 5 phr.

In another embodiment, the composition may comprise a HSBB present at about 50 to about 100 phr may optionally include a halogenated poly(isobutylene-co-p-methylstyrene) about 5 to about 95 phr in one embodiment, and about 20 to about 70 phr in another embodiment, and (polybutene) processing oil present at about 3 to about 30 phr, a filler such as a carbon black at about 20 to about 80 phr, and an exfoliating clay at about 0.5 to about 20 phr in one embodiment, and about 2 to about 15 phr in another embodiment. Cure agents such as phenolic resins, sulfur, stearic acid, and zinc oxide, may be present individually or in combination at about 0.1 to about 5 phr.

In yet another embodiment, the composition may comprise a halogenated butyl rubber present at about 50 to about 100 phr that may include a halogenated poly(isobutylene-co-p-methylstyrene) at about 5 to about 95 phr in one embodiment, and about 20 to about 80 phr in another embodiment, and (polybutene) processing oil present at about 3 to 30 phr, a filler such as a carbon black at about 20 to about 80 phr, and an exfoliating clay at about 0.5 to about 20 phr in one embodiment, and about 2 to about 15 phr in another embodiment. Cure agents such as phenolic resins, sulfur, stearic acid, and zinc oxide, may be present individually or in combination at about 0.1 to about 5 phr.

The compositions of the present invention and layered structures formed using such compositions can be used in tire applications; tire curing bladders; air sleeves, such as air shock absorbers, diaphragms; and hose applications, including gas and fluid transporting hoses. The compositions and tie layer comprising such compositions are particularly useful in pneumatic tires to facilitate the adhesion and air holding qualities of a tire innerliner to the inner surface of the tire. An especially useful construction is one in which a tire innerliner layer forms the innermost surface of the tire and the innerliner layer surface opposite the one that forms the air holding chamber is in contact with the tie layer of the present invention. Alternatively, an adhesive layer can be used between the innerliner layer and the tie layer. The surface of the tie layer opposite the one that is in contact with the innerliner (or adhesive layer) is in contact with the tire layer referred to as the carcass; in other words, the tire layer typically comprising reinforcing tire cords. As discussed in detail above, the innerliner layer exhibits advantageously low permeability properties and preferably comprises a dynamically vulcanized composition comprising an engineering resin, particularly polyamide, and a halogenated isobutylene-paramethyl styrene copolymer. Furthermore, as a consequence of the unique composition of the tie layer based on a vulcanizable halogenated isobutylene elastomer, in particular its low air permeability property and ability to generate high vulcanized adhesion to the innerliner layer surface in which it is in contact, allows for the use of a thin tie layer compared to compositions containing primarily high diene rubber. The resulting overall structure based on such innerliner and tie layers allows for a tire construction (as well as other constructions comprising an air or fluid holding layer and tie layer) having reduced weight. Such weight savings in a tire construction are significant:

| Innerliner Layer Construction | Tie Layer Construction | Estimated Weight Savings |
|---|---|---|
| 0.5 mm BIIR/NR | 0.7 mm NR/SBR | — |
| 0.15 mm DVA | 0.7 mm BIMS/NR | 4 |
| 1.0 mm BIIR | 0.7 mm NR/SBR | — |
| 0.15 mm DVA | 0.3 mm BIIR/NR | 13 |

"DVA" refers to a dynamically vulcanized composition comprising an engineering resin, e.g., nylon, and a halogenated, preferably brominated, isobutylene paramethyl styrene elastomer;
NR refers to natural rubber;
SBR refers to styrene butadiene rubber;
BIIR refers to brominated isobutylene isoprene rubber; and
BIMS refers to brominated isobutylene paramethyl styrene elastomer.

Naturally, adjustment of the concentration and type of halogenated elastomer in the tie layer, compositional adjustments in the innerliner layer and selection of the thickness of each of these layers can result in different weight savings. Typically, the air holding (or fluid holding in the case of applications other than tires) characteristics determine choice of such variables and limited experimentation can be used by the compounder and/or designer to assist in making such decisions. However, typically about 2% to about 16% weight savings can be realized; alternatively, about 4% to about 13% weight savings. Such improvements are particularly meaningful in an application such as pneumatic tires.

The tire innerliner composition (i.e. preferably a DVA of nylon and BIMS) may be prepared by using conventional mixing techniques including, e.g., kneading, roller milling, extruder mixing, internal mixing (such as with a Banbury® mixer) etc. The sequence of mixing and temperatures employed are well known to the rubber compounder of ordinary skill in the art, the objective being the dispersion of fillers, activators and curatives in the polymer matrix under controlled conditions of temperature that will vary depending on whether the innerliner is based on the incorporation of an engineering resin in combination with DVA technology, as described above, or on non-DVA technology. For preparation of an innerliner based on non-DVA technology, a useful mixing procedure utilizes a Banbury mixer in which the copolymer rubber, carbon black and plasticizer are added and the composition mixed for the desired time or to a particular temperature to achieve adequate dispersion of the ingredients. Alternatively, the rubber and a portion of the carbon black (e.g., one-third to two thirds) is mixed for a short time (e.g., about 1 to 3 minutes) followed by the remainder of the carbon black and oil. Mixing is continued for about 5 to 10 minutes at high rotor speed during which time the mixed components reach a temperature of about 140° C. Following cooling, the components are mixed in a second step, e.g., on a rubber mill or in a Banbury mixer, during which the cure system, e.g., curing agent and optional accelerators, are thoroughly and uniformly dispersed at relatively low temperature, e.g., about 80 to about 105° C., to avoid premature curing or "scorching" of the composition. Variations in mixing will be readily apparent to those skilled in the art and the present invention is not limited to any specific mixing procedure. The mixing is performed to disperse all components of the composition thoroughly and uniformly.

The innerliner layer or "stock" is then prepared by calendering the compounded rubber composition into sheet material having a thickness of about 0.5 mm to about 2 mm and cutting the sheet material into strips of appropriate width and length for innerliner application in a particular size or type tire. The innerliner is then ready for use as an element in the construction of a pneumatic tire. The pneumatic tire is typically comprised of a multilayered laminate comprising an outer surface which includes the tread and sidewall elements, an intermediate carcass layer which comprises a number of plies containing tire reinforcing fibers, (e.g., rayon, polyester, nylon or metal fibers) embedded in a rubbery matrix, a tie layer as described herein, an optional adhesive layer, and an innerliner layer. Tires are normally built on a tire forming drum using the layers described above. After the uncured tire has been built on the drum, it is removed and placed in a heated mold. The mold contains an inflatable tire shaping bladder that is situated within the inner circumference of the uncured tire. After the mold is closed the bladder is inflated and it shapes the tire by forcing it against the inner surfaces of the closed mold during the early stages of the curing process. The heat within the bladder and mold raises the temperature of the tire to vulcanization temperatures. Vulcanization temperatures are typically about 100° C. to about 250° C.; preferably about 150° C. to about 200° C. Cure time may vary from about one minute to several hours; preferably from about 5 to 30 minutes. Cure time and temperature depend on many variables well known in the art, including the composition of the tire components, including the cure systems in each of the layers, the overall tire size and thickness, etc. Vulcanization parameters can be established with the assistance of various well-known laboratory test methods, including the test procedure described in ASTM D2084-01, (Standard Test Method for Rubber Property-Vulcanization Using Oscillating Disk Cure Meter) as well as stress-strain testing, adhesion testing, flex testing, etc. Vulcanization of the assembled tire results in complete or substantially complete vulcanization or crosslinking of all elements or layers of the tire assembly, i.e., the innerliner, the carcass and the outer tread and sidewall layers. In addition to developing the desired strength characteristics of each layer and the overall structure, vulcanization enhances adhesion between these elements, resulting in a cured, unitary tire from what were separate, multiple layers.

FIG. 1 is a semi-cross-sectional view along the meridian direction of a tire illustrating a typical example of the arrangement of an air permeation prevention or innerliner layer of a pneumatic tire. In FIG. 1, a carcass layer 2 spans between the left and right bead cores 1 (note that, since only one-half of the symmetrical cross-sectional view is included for simplicity, the second bead core is not illustrated). On the tire inner surface, inside of the carcass layer 2 there is provided an innerliner layer 3. Interposed between the innerliner layer and the carcass layer is the tie layer 5 of the present invention. The innerliner layer is indicated at 3 and the tire sidewall at 4. In an optional embodiment, an adhesive layer may be present between 3 and 5.

The following examples are provided as specific illustrations of embodiments of the claimed invention. It should be understood, however, that the invention is not limited to the specific details set forth in the examples. All parts and percentages in the examples, as well as in the specification, are by weight unless otherwise specified. Furthermore, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% .... 50%, 51%, 52% .... 95%, 96%, 97%, 98%, 99%, or 100%. Moreover, any numerical range represented by any two values of R, as calculated above is also specifically disclosed.

For purposes of the present invention, unless otherwise defined with respect to a specific property, characteristic or variable, the term "substantially" as applied to any criteria, such as a property, characteristic or variable, means to meet the stated criteria in such measure such that one skilled in the art would understand that the benefit to be achieved, or the condition or property value desired is met.

Throughout the entire specification, including the claims, the word "comprise" and variations of the word, such as "comprising" and "comprises," as well as "have," "having," "includes," "include" and "including," and variations thereof, means that the named steps, elements or materials to which it refers are essential, but other steps, elements or materials may be added and still form a construct, composition or process within the scope of the claim or disclosure. When recited in describing the invention and in a claim, it means that the invention and what is claimed is considered to be what follows and potentially more. These terms, particularly when applied to claims, are inclusive or open-ended and do not exclude additional, unrecited elements or methods steps.

As used throughout the specification, including the described embodiments, the singular forms "a," an," and "the" include plural referents unless the context clearly dictates otherwise. Thus, for example, reference to "a tackifier" includes a single tackifier as well a two or more different tackifiers in combination; reference to "a halogenated isobutylene elastomer" includes mixtures of two or more halogenated isobutylene elastomers as well as a halogenated isobutylene elastomer, and the like.

The term "about" encompasses greater and lesser values than those specifically recited provided that the value of the relevant property or condition facilitates reasonably meeting the technologic objective(s) of the present invention as described in detail in the specification and claims. More specifically, the term "about" when used as a modifier for, or in conjunction with, a variable, is intended to convey that the numbers and ranges disclosed herein are flexible and that practice of the present invention by those skilled in the art using', for example, concentrations, amounts, contents, carbon numbers, temperatdres, pressures, properties such as density, purity, etc., that are outside of a stated range or different from a single value, will achieve the desired result, namely, an elastomer composition comprising an isobutylene-containing elastomer suitable for use in a tire tie layer, wherein the composition has improved tire building tack, cured adhesion and impermeability properties.

Any range of numbers recited in the specification hereinabove or in the paragraphs and claims hereinafter, referring to various aspects of the invention, such as that representing a particular set of properties, units of measure, conditions, physical states or percentages, is intended to literally incorporate expressly herein by reference or otherwise, any number falling within such range, including any subset of numbers or ranges subsumed within any range so recited. Furthermore, the term "about" when used as a modifier for, or in conjunction with, a variable, characteristic or condition is intended to convey that the numbers, ranges, characteristics and conditions disclosed herein are flexible and that practice of the present invention by those skilled in the art using temperatures, concentrations, amounts, contents, carbon numbers, properties such as particle size, surface area, bulk density, etc., that are outside of the range or different from a single value, will achieve the desired result, namely, an elastomer composition comprising an isobutylene-containing elastomer suitable for a tire tie layer and having improved impermeability properties.

In an alternate embodiment, the compositions described herein may be used in a pressure vessel, e.g. any vessel designed to hold greater than atmospheric pressure of a fluid (liquid or gas, such as air or water). Preferably the vessel holds at least 10 psi of pressure for 24 hours at 230° C., more preferably at least 20 psi.

EXAMPLES

Compositions were prepared according to the following examples. The amount of each component used is based on parts per hundred rubber (phr) present in the composition. The following commercially available products were used for the components employed in the compositions of the examples:

| Rubber Components | Description |
| --- | --- |
| BIIR | Bromobutyl ™ 2222 (brominated isobutylene isoprene copolymer, 2% Br, ExxonMobil Chemical Company, Houston Texas) |
| BIMS-1 | Exxpro ™ 90-10 (brominated isobutylene p-methyl styrene copolymer, 1.2% Br, 7.5% PMS, ExxonMobil Chemical Company Houston Texas) |
| BIMS-2 | Exxpro ™ 89-4 (brominated isobutylene p-methyl styrene copolymer, 0.75% Br, 5% PMS, ExxonMobil Chemical) |
| NR | SMR-20 natural rubber (Standard Malaysian Rubber) |

-continued

| Rubber Components | Description |
|---|---|
| SBR | Copo ™-1502 (styrene-butadiene rubber, 23.5% bound styrene, DSM Copolymer, Netherlands) |
| Cure System Components | |
| ZnO | Zinc oxide - cure system component |
| St-acid | Stearic acid - cure system component |
| ZnSt | Zinc stearate - cure system component |
| S | sulfur - cure system component |
| MBTS | sulfur-containing cure system accelerator 2,2'-benzothiazyl disulfide |
| Additive Components | |
| Struktol 40MS | Compound compatibilizer (mixture of dark aromatic hydrocarbon resins, Struktol Company) |
| Calsol 810 | naphthenic processing oil (Calumet Lubricants) |
| Flectol | Flectol TMQ antioxidant (polymerized 1,2-dihydro-2,2,4-trimethylquinoline, Flexsys America) |
| N660 | Carbon black (semi-reinforcing grade) |
| T1 | SP1068 (tackifier 1 - alkyl phenol formaldehyde resin, Schenectady International) |
| T2 | G100 (tackifier 2 - synthetic polyterpene resin (Quintone brand, Nippon Zeon Chemicals) |
| T3 | Sylvalite RE100L (tackifier 3 - pentaerythritol ester of rosin, Arizona Chemical) |
| Engineering Resin Component | |
| N11 | Nylon 11 available as Rilsan BMN O from Arkema |
| N6/66 | Nylon 6/66 copolymer available as Ube 5033B from Ube |
| Additive Component | |
| P | Plasticizer, BM-4, N-butylbenzene sulfonamide (Daihachi Chemical Ind.) |
| R1 or C | Reactive softener or Compatibilizer, AR201, maleated ethylene vinyl acetate (EVA) copolymer DuPont-Mitsui |
| S1 | Stabilizer 1, package includes Irganox, Tinuvin, and Copper Iodide (CuI) |

In accordance with the compositions or formulations listed in Table 1, Examples 1 to 6 were prepared using a Banbury internal mixer and mixed using standard, non-DVA mixing procedures. In a typical mix cycle, the Banbury is preheated to between 40° C. and 60° C. and the polymers are added and mixed; at one minute the remainder of the ingredients (except curatives) are added and mixing is continued to a temperature of about 130° C. to about 150° C. at which time the composition is dumped and cooled. The cooled material is then placed back in the Banbury and the components of the cure system are then added to the composition in the Banbury mixer and the composition mixed to a temperature of about 100° C. and then dumped and cooled. Example 1 is a typical bromobutyl innerliner compound commonly used as a thermoset innerliner or air permeation prevention layer in a pneumatic tire. Test results show that permeability is lowered with increasing BIMS content in the tie layer composition. All tie compositions based on BIMS and NR blends have excellent adhesion against the carcass compound.

TABLE 1

| | Example | | | | | |
|---|---|---|---|---|---|---|
| | 1 | 2 | 3 | 4 | 5 | 6 |
| | Description-Layer Type | | | | | |
| | Innerliner | Tie | Tie | Tie | Tie | Carcass |
| BIIR (phr) | 100 | 0 | 0 | 0 | 0 | 0 |
| BIMS-1 (phr) | 0 | 65 | 70 | 75 | 80 | 0 |
| NR (phr) | 0 | 35 | 30 | 25 | 20 | 70 |
| SBR (phr) | 0 | 0 | 0 | 0 | 0 | 30 |
| N660 (phr) | 60 | 60 | 60 | 60 | 60 | 50 |
| Calsol 810 (phr) | 5 | 5 | 5 | 5 | 5 | 10 |
| Struktol 40MS (phr) | 7 | 7 | 7 | 7 | 7 | 0 |
| T1 (phr) | 4 | 4 | 4 | 4 | 4 | 5 |
| Flectol (phr) | 0 | 0 | 0 | 0 | 0 | 1 |
| St-acid (phr) | 2 | 1 | 1 | 1 | 1 | 2 |
| ZnO (phr) | 3 | 1 | 1 | 1 | 1 | 3 |
| S (phr) | 0.5 | 1 | 1 | 1 | 1 | 2 |
| MBTS (phr) | 1.5 | 1 | 1 | 1 | 1 | 1 |
| Permeability* | 26.3 | 49.4 | 45.1 | 38.9 | 35.0 | 261.0 |
| Adhesion** | Good | Good | Good | Good | Good | Good |

*Permeability test: oxygen permeability at 60° C. measured by Mocon tester in units of cc-mils/m²-day-mmHg
**All compounds were laminated against the carcass layer of Example 6 and cured for t90 + 2 at 160° C. (based on ASTM D2084-92A). Adhesion value measured based on force required to separate the two layers at 100° C. "Good adhesion" is characterized as a value greater than 5 N/mm.

In accordance with the composition or formulation listed in Table 2, the thermoplastic elastomeric innerliner layer of Example 7 was prepared using a dynamic vulcanization mixing method and a twin-screw extruder at 230° C. The DVA was prepared according to the procedure described in EP 0 969 039, with specific reference to the section entitled "Production of Thermoplastic Elastomer Composition." The elastomer component and vulcanization system were charged into a kneader, mixed for approximately 3.5 minutes, and dumped out at about 90° C. to prepare an elastomer component with a vulcanization system. The mixture was then pelletized by a rubber pelletizer. Next, the elastomer component and resin components were charged into a twin screw mixing extruder and dynamically vulcanized to prepare a thermoplastic elastomer composition.

Additionally, an adhesive layer based on SBS and containing tackifier and curatives (prepared according to the procedure in WO2005030479, Example 3 of Table 1) was co-extruded with the DVA via co-extrusion blown film preparation as described in WO2005030479, specifically FIG. 1.

TABLE 2

| | Example 7 |
|---|---|
| BIMS-2 (phr) | 100 |
| ZnO (phr) | 0.15 |
| St-acid (phr) | 0.60 |
| ZnSt (phr) | 0.30 |
| N11 (phr) | 40.4 |
| N6/66 (phr) | 27.8 |
| P (phr) | 11.0 |
| C (phr) | 10.1 |
| S1 (phr) | 0.51 |
| Permeability* | 12.1 |

*Permeability test: oxygen permeability at 60° C. measured by Mocon tester in units of cc-mils/m²-day-mmHg 0.5 mm film layers from the composition of Example 3 and 0.4 mm film layers from the composition of Example 6 were formed into a laminated or layered construction using either 0.36 mm film layer of Example 1 or 0.18 mm film layer of Example 7 for permeability measurements. The layered constructions or laminates were cured at 160° C. Use of the BIMS-containing tie layer of Example 3, can be seen to lower the overall permeability of the laminated or layered structure.

TABLE 3

| | Example | | | |
|---|---|---|---|---|
| | 8 | 9 | 10 | 11 |
| Innerliner layer | Example 1 | Example 1 | Example 7 | Example 7 |
| Tie layer | Example 6 | Example 3 | Example 6 | Example 3 |
| Permeability* | 35.4 | 22.5 | 31.6 | 22.6 |

*Permeability: oxygen permeability at 60° C. measured by Mocon tester in unit of cc-mils/m²-day-mmHg The tie layer compositions of Examples 12 and 13 as shown in Table 4 were prepared as described above.

TABLE 4

| | Example | |
|---|---|---|
| | 12 | 13 |
| Description | Tie Layer | Tie Layer |
| BIMS-1 (phr) | 50 | 80 |
| NR (phr) | 50 | 20 |
| N660 (phr) | 58.5 | 58.5 |
| Calsol 810 (phr) | 7.1 | 7.1 |
| T2 (phr) | 4 | 4 |
| T3 (phr) | 2 | 2 |
| St-acid (phr) | 1.5 | 1.5 |
| Zno (phr) | 3.5 | 3.5 |
| S (phr) | 0.75 | 0.75 |
| ZnSt (phr) | 2 | 2 |

0.7 mm film layers of Example 6, Example 12, and Example 13 were laminated onto 0.15 mm film layer of Example 7 and, subsequently, incorporated in standard pneumatic tires, grade 225/60R16. The layers were arranged such that the tie layers were positioned between the DVA innerliner layer of Example 7 and the innermost carcass surface layer of the tire; the layer of Example 6 functioned as a non-halogenated isobutylene containing tie layer. The adhesive layer previously described was also co-extruded and used. The tires produced are identified in Table 5 as Examples 14, 15, and 16. The air pressure losses and tire testing results shown in Table 5 demonstrate the advantage of using a BIMS/NR, or halogenated isobutylene-containing elastomer in the tie layer, particularly in combination with an innerliner layer containing an engineering resin wherein the composition is prepared using a dynamic vulcanization method.

TABLE 5

| | Example | | |
|---|---|---|---|
| | 14 | 15 | 16 |
| Tire type | 225/60R16 | 225/60R16 | 225/60R16 |
| Innerliner | Example 7 | Example 7 | Example 7 |
| Tie Layer | Example 6 | Example 11 | Example 12 |
| Tire Quality | Good | Good | Good |
| Tire Durability | Good | Good | Good |
| Rolling Resistance | Good | Good | Good |
| Air loss (%/month) | 2.32 | 2.30 | 1.55 |

Additional experiments were carried out to evaluate the performance of tackifiers in the tie layer and to develop compositions exhibiting sufficient tire building tack and cured properties so as to eliminate the need for a separate adhesive layer. In accordance to formulations listed in Table 6, example 17 was prepared using a dynamic vulcanization twin-screw extruder at 220° C. The elastomer component and vulcanization system were charged into a kneader, mixed for about 3.5 minutes and dumped out at about 90° C. The mixture was then pelletized using a rubber pelletizer. Premixing of nylon components with plasticizer and stabilizers was performed using a Japan Steel Works, Ltd. Model 44 (JSW-44) twin screw extruder at 210° C. All pre-blended nylon components, pre-compounded rubber pellets, and reactive softener were then metered into a JSW-44 twin screw extruder at 220° C. for extrusion mixing and dynamic vulcanization. Extrudates were cooled in a water bath, pelletized and dried. The dried pellets were then used to produce cast and blown films.

TABLE 6

| Component | Example 17 (phr) |
|---|---|
| BIMS | 100 |
| ZnO | 0.15 |
| St-acid | 0.60 |
| ZnSt | 0.30 |
| N6/66 | 66.53 |
| P1 | 23.4 |
| R1 | 10 |
| S1 | 0.5 |

Due to the non-tacky nature of the nylon surface present in the thermoplastic elastomer of Example 17, it is important for tackifiers used in the rubber tie layer to possess tack against the composition of Example 17. The following commercially available tackifiers were screened for their tackiness against the composition of Example 17.

TABLE 7

| Commercial Tackifiers Evaluated for Tackiness | | |
|---|---|---|
| Material | Description | Source |
| Rosin | rosin, MR1085A | Mobil Rosin Oil Company |
| PIBSA | succinic anhydride functionalized polyisobutylene, Infineum C9220 | Infineum USA L.P. |
| PB | polybutene, Soltex 124 | Sun Chemicals |
| SP1068 | phenolic tackifier, SP1068 | Schenectady Chemicals |
| Escorez | aliphatic hydrocarbon tackifier, Escorez 1102 | ExxonMobil Chemical |
| Exxelor | maleated ethylene-propylene copolymer, Exxelor 1803 | ExxonMobil Chemical |
| EMFR100 | maleated hydrocarbon tackifier, EMFR100 | ExxonMobil Chemical |
| EMFR101 | maleated hydrocarbon tackifier, EMFR 101 | ExxonMobil Chemical |
| Unirez 2653 | low MW polyamide tackifier, Unirez 2653 | Arizona Chemical |
| C200H | maleated hydrocarbon tackifier, Nippon Zeon C200H | Nippon Chemical |
| Unirez 2614 | low MW polyamide tackifier, Unirez 2614 | Arizona Chemical |
| Unirez 2651 | low MW polyamide tackifier, Unirez 2651 | Arizona Chemical |
| AT501 | epoxidized SBS, Epofriend AT501 | Daicel Chemical |
| Unirez 110 | low MW polyamide tackifier, Unirez 110 | Arizona Chemical |

Testing for tackiness was conducted as follows: A wooden splint of 15 cm by 2 cm with 1.7 mm thickness was dipped into the tackifiers in liquid form. Pellet-type tackifiers were heated to a molten condition before the splint was dipped. Splints coated with tackifier were contacted with a 0.2 mm thick film of the composition of Example 17. For purposes of the present invention a tackifier was considered to have "good" tack against the composition of Example 1 if the splint containing the tackifier was capable of lifting the film of Example 17 after contact and the film could not easily be peeled away. A tackifier was considered to have "some" tack against the composition of Example 17 if the splint containing the tackifier was capable of lifting the film of Example 17 after contact and the film could easily or readily be peeled away. A tackifier was considered to have "no" tack against Example 17 if the splint containing the tackifier could not lift the film of Example 17. As shown in Table 8 for Examples 18 to 31, only rosin, PIBSA, and PB have good tack against Example 1.

TABLE 8

| Example | Tackifier | Tack Response |
|---|---|---|
| 18 | Rosin | Good |
| 19 | PIBSA | Good |
| 20 | PB | Good |
| 21 | Exxelor | Some |
| 22 | Unirez 2614 | Some |
| 23 | SP1068 | No |
| 24 | Escorez | No |
| 25 | EMFR 100 | No |
| 26 | EMFR 101 | No |
| 27 | Unirez 2653 | No |
| 28 | Unirez 2651 | No |
| 29 | AT501 | No |
| 30 | Unirez 110 | No |
| 31 | C200H | No |

The following commercially available products were used for the preparation of tie layer rubber compositions and a model tire carcass compound. These tie layer rubber compositions were then tested for their tack response and cured adhesion against the thermoplastic elastomer, dynamically vulcanized innerliner composition of Example 17 and the model carcass compound.

TABLE 9

| Tie Rubber Component | |
|---|---|
| Component | Description |
| BIIR | Bromobutyl 2222 (ExxonMobil Chemical) |
| BIMS-1 | Exxpro 3745 (ExxonMobil Chemical) |
| NR | SMR-20 natural rubber |
| SBR | Styrene-butadiene copolymer rubber, grade 1502 |
| ZnO | Zinc oxide curative |
| St-acid | Stearic acid curative |
| ZnSt | Zinc stearate curative |
| S | sulfur curative |
| MBTS | sulfur curative accelerator |
| Santocure TBBS | sulfur curative accelerator (Flexsys America LP) |
| Struktol 40MS | compound compatibilizer |
| Calsol 810 | processing oil |
| Flectol | Flectol TMQ antioxidant |
| N660 | Carbon black (semi-reinforcing grade) |
| Additional tackifiers | |
| TP300 | terpene phenolic resin tackifier (Arizona Chemical) |
| Koresin | acetylene-p-tert-butyl phenol condensation product (BASF) |

In accordance to formulations listed in Table 10, tie rubber compounds of Examples 32A to 32I and the carcass compound of Example 33 were prepared using a Banbury internal mixer. The compounds were accelerated on a mill (in other words the curatives were dispersed in the compounds on a rubber mill at a temperature low enough to avoid premature activation of the curatives and sufficiently high to promote effective dispersion) and calendered into sheets. Although PB and PIBSA were found to provide good tack against the composition of Example 17 according to Table 8, they were not used in the compositions of Table 10 due to the relative high reactivity of PIBSA resulting in compounds containing PIBSA tackifier exhibiting undesirably short "scorch" times, also known as premature curing at typical processing temperatures. Additionally, PB was found to have excessive solubility in BIMS or in BIIR and, thus, could not diffuse to the surface of the tie rubber compound after calendering in order to provide sufficient tack. The tack results listed in Table 10 were obtained using a Tel-Tack tester (Monsanto). Samples of 6.4 cm by 0.64 cm size were cut from calendered sheets of each composition and conditioned at 23° C. for 24 hours prior to the tack measurements. The tack value represents the force required to separate two layers. For purposes of the present examples, if the tack value is less than 100 KPa, the compound is considered to exhibit "no tack" (N). If the value is between 100 KPa to 120 KPa, it is considered to have "some tack" (S). If the value is from 120 KPa to 150 KPa, it is considered to have "good tack" (G). If the value is greater than 150 KPa, it is considered to have "excellent tack" (E).

TABLE 10

| Compositions and Performance | | | | | | | | | | |
|---|---|---|---|---|---|---|---|---|---|---|
| Example | 32A | 32B | 32C | 32D | 32E | 32F | 32G | 32H | 32I | 33 |
| BIMS-1 | 70 | 70 | 70 | 70 | 70 | 70 | 70 | 70 | 70 | 0 |
| NR | 30 | 30 | 30 | 30 | 30 | 30 | 30 | 30 | 30 | 70 |
| SBR | 0 | 0 | 0 | 0 | 0 | 0 | 0 | 0 | 0 | 30 |
| N660 | 60 | 60 | 60 | 60 | 60 | 60 | 60 | 60 | 60 | 50 |
| Calsol 810 | 5 | 5 | 5 | 5 | 5 | 5 | 5 | 5 | 5 | 10 |
| Struktol 40MS | 7 | 7 | 7 | 7 | 7 | 7 | 7 | 7 | 7 | 0 |
| Flectol | 0 | 0 | 0 | 0 | 0 | 0 | 0 | 0 | 0 | 1 |
| Escorez | 8 | 0 | 0 | 0 | 0 | 0 | 0 | 0 | 0 | 5 |
| Rosin | 0 | 8 | 0 | 0 | 0 | 0 | 4 | 12 | 4 | 0 |
| TP300 | 0 | 0 | 8 | 0 | 0 | 0 | 0 | 0 | 0 | 0 |

TABLE 10-continued

Compositions and Performance

| Example | 32A | 32B | 32C | 32D | 32E | 32F | 32G | 32H | 32I | 33 |
|---|---|---|---|---|---|---|---|---|---|---|
| Unirez 2614 | 0 | 0 | 0 | 8 | 0 | 0 | 0 | 0 | 0 | 0 |
| AT501 | 0 | 0 | 0 | 0 | 8 | 0 | 0 | 0 | 0 | 0 |
| SP1068 | 0 | 0 | 0 | 0 | 0 | 8 | 0 | 0 | 0 | 0 |
| Koresin | 0 | 0 | 0 | 0 | 0 | 0 | 0 | 0 | 4 | 0 |
| St-acid | 1 | 1 | 1 | 1 | 1 | 1 | 1 | 1 | 1 | 2 |
| ZnO | 1 | 1 | 1 | 1 | 1 | 1 | 1 | 1 | 1 | 3 |
| S | 0.5 | 0.5 | 0.5 | 0.5 | 0.5 | 0.5 | 0.5 | 0.5 | 0.5 | 2 |
| MBTS | 1 | 1 | 1 | 1 | 1 | 1 | 1 | 1 | 1 | 0 |
| TBBS | 0 | 0 | 0 | 0 | 0 | 0 | 0 | 0 | 0 | 1.5 |
| Tack vs. Ex. 17 | N | S | N | N | N | N | S | S | G | N |
| Tack vs. Ex. 33 | E | E | E | E | E | E | E | E | E | E |

As shown in Table 10, all compounds have excellent tack against the carcass compound of Example 33. However, only compounds containing rosin have some or good tack against the thermoplastic elastomer of Example 17. Furthermore, only one compound exhibits good tack against the compound of Example 17 is Example 32I with a blend of rosin and Koresin.

The combination of rosin and Koresin was evaluated in various tie layer rubber compounds as shown in Table 11. To test the tire building tackiness and cured adhesion of these compounds to the thermoplastic elastomer of Example 17, splice joints were prepared for each compound. The compounds of Examples 34-41 were calendered into sheets after mixing and the thermoplastic elastomer film of Example 17 was pressed onto each compound manually to prepare a laminate. The laminate was then cut diagonally both across the width and across the depth. The cut laminates were then hand spliced together. The spliced laminate was then tested for its splice strength in tensile using an "Instron" brand tester to measure the maximum force required to separate the splice as well as the tensile extension of the splice. Further, a sample of the laminate was cured in a compression mold at 180° C. for 10 minutes (the cure time typically used for a passenger car tire) and, subsequently, tested for its cured strength.

TABLE 11

Compositions

| Example | 34 | 35 | 36 | 37 | 38 | 39 | 40 | 41 |
|---|---|---|---|---|---|---|---|---|
| BIIR | 100 | 10 | 80 | 0 | 0 | 0 | 0 | 0 |
| BIMS-1 | 0 | 35 | 0 | 100 | 100 | 100 | 100 | 100 |
| NR | 0 | 55 | 20 | 0 | 0 | 0 | 0 | 0 |
| N660 | 60 | 60 | 60 | 60 | 60 | 60 | 60 | 40 |
| Calsol 810 | 8 | 4 | 8 | 8 | 8 | 8 | 8 | 8 |
| Struktol 40MS | 0 | 0 | 0 | 0 | 8 | 0 | 0 | 0 |
| Rosin | 6 | 6 | 6 | 6 | 6 | 6 | 6 | 6 |
| Koresin | 6 | 6 | 6 | 6 | 6 | 6 | 6 | 6 |
| St-acid | 2 | 2 | 2 | 2 | 2 | 1 | 2 | 2 |
| ZnO | 3 | 3 | 3 | 1.5 | 1.5 | 1.5 | 1.0 | 1.5 |
| S | 0.5 | 2 | 0.5 | 0.5 | 0.5 | 0.5 | 0.5 | 0.5 |
| MBTS | 1.5 | 0 | 1.5 | 1 | 1 | 1 | 0.5 | 1 |
| TBBS | 0 | 1 | 0 | 0 | 0 | 0 | 0 | 0 |

A comparison example 42 shown in Table 12 is based on the 100% BIIR compound of Example 34. To simulate typical splice strength of bromobutyl-based innerliner, sheets of Example 34 were not laminated to the thermoplastic elastomer of Example 17. Instead, a sheet of Example 34 was cut diagonally across the width and thickness and then spliced with itself to prepare the sample of Example 42. Further, the self-spliced structure of Example 42 was cured in a compression mold at 180° C. for 10 minutes. Both the splice strength and cured strength of the Example 42 represent the splice strength required for tire building.

TABLE 12

Compositions and Performance

| Example | 34 | 35 | 36 | 37 |
|---|---|---|---|---|
| Uncured Splice | | | | |
| Load (N) | 61 | 44 | 60 | 65 |
| Extension (%) | 298 | 394 | 119 | 224 |
| Cured Splice | | | | |
| Load (N) | 53 | 107 | 66 | 131 |
| Extension (%) | >100 | 55 | >100 | >100 |

| Example | 38 | 39 | 40 | 41 | 42 |
|---|---|---|---|---|---|
| Uncured Splice | | | | | |
| Load (N) | 60 | 67 | 64 | 55 | 30 |
| Extension (%) | 202 | 193 | 180 | 146 | 202 |
| Cured Splice | | | | | |
| Load (N) | 177 | 149 | 278 | 159 | 43 |
| Extension (%) | 100 | 87 | 102 | 102 | 100 |

As shown in Table 12, using the combination of rosin and Koresin in all tie layer compound formulations, acceptable splice strength and elongation, as compared with Example 42, could be obtained for tire building. In addition, the presence of these tackifiers shows no adverse effects on cured adhesion between the tie rubber compound and the thermoplastic elastomer film of Example 17.

All documents described herein are incorporated by reference herein, including any priority documents and/or testing procedures to the extent they are not inconsistent with this text. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Likewise, the term "comprising" is considered synonymous with the term "including" for purposes of Australian law.

The invention claimed is:

1. A vulcanizable layered composition comprising at least two layers and at least one tie layer, wherein the first layer of the two layers comprises an fluid permeation prevention layer, the second layer of the two layers comprises at least one high diene rubber, and the tie layer comprises a mixture of:
   (1) about 60 to about 90 weight % of at least one halogenated isobutylene containing elastomer;
   (2) about 10 to about 40 weight % of at least one high diene elastomer;
   (3) about 20 to about 50 weight % of at least one filler;
   (4) about 0 to about 30 weight % of at least one processing oil;
   (5) about 1 to about 20 parts per hundred of a tackifier mixture of at least one of rosin or rosin derivatives and a condensate of tert-butyl phenol and acetylene and wherein said at least two tackifiers are present at a weight ratio of one of the other of about 1 to about 10 to about 10 to about 1; and
   (6) about 0.2 to about 15 parts per hundred of rubber of a curing system for the elastomers;
wherein said fluid permeation prevention layer comprises a polymer composition a Young's modulus of 1 to 500 MPa, said polymer composition comprising:
   (A) at least 10% by weight, based on the total weight of the polymer composition, of at least one thermoplastic engineering resin component having a Young's modulus of more than 500 MPa, where the thermoplastic engineering resin component is selected from the group consisting of polyamide resins, polyester resins, polynitrile resins, polymethacrylate resins, polyvinyl resins, cellulose resins, fluororesins, and imide resins, and
(B) at least 10% by weight, based on the total weight of the polymer composition, of at least one elastomer component having a Young's modulus of not more than 500 MPa, where the elastomer component is selected from the group consisting of diene rubbers and the hydrogenates thereof, halogen-containing rubbers, silicone rubbers, sulfur-containing rubbers, fluoro-rubbers, hydrin rubbers, acryl rubbers, ionomers and thermoplastic elastomers, and
   where the total amount of the component (A) and the component (B) is not less than 30% by weight based on the total weight of the polymer composition, wherein the elastomer component (B) is dispersed in a vulcanized or partially vulcanized state, as a discontinuous phase, in a matrix of the thermoplastic resin component (A) in the polymer composition and
   wherein the amount and type of said at least one tackifier is effective to provide sufficient uncured adhesive strength to permit the building of said multilayered construction without substantial delamination of said tie layer to an adjoining layer prior to the establishment of crosslinking in an amount to provide suitable adhesion between said layers resulting in an acceptable multilayered construction.

2. The composition of claim 1 wherein component (1) is (i) a halogen-containing random copolymer of a $C_4$ to $C_7$ isomonoolefin and a para-alkylstyrene, said para-alkylstyrene comprising about 0.5 to about 20 weight percent of said copolymer, or (ii) a halogen-containing random copolymer of a $C_4$ to $C_{12}$ isomonoolefin and a C4 to C14 multiolefn; in each instance, said halogen selected from the group consisting of chlorine, bromine and mixtures thereof.

3. The composition of claim 2 wherein said component (ii) is selected from the group consisting of chlorinated butyl rubber, brominated butyl rubber, chlorinated star branched butyl rubber, brominated star branched butyl rubber, chlorinated high triad fraction butyl rubber, brominated high triad fraction butyl rubber, chlorinated butyl rubber substantially free of long chain branching, brominated butyl rubber substantially free of long chain branching and mixtures thereof.

4. The composition of claim 1 wherein said component (2) is a natural or synthetic rubber comprising at least 50 mole % of diene monomer and selected from the group consisting of polyisoprene, polybutadiene, poly (styrene-co-butadiene), poly (styrene-butadiene-styrene) block copolymer, natural rubber and mixtures thereof.

5. The composition of claim 1 wherein said at least one elastomer component B is selected from the group consisting of a halide of a $C_4$ to $C_7$ isomonoolefin and p-alkylstyrene copolymer, brominated isobutylene p-methylstyrene copolymer, hydrogenated nitrile-butadiene rubber, acrylonitrile butadiene rubber, chlorosulfonated polyethylene, chlorinated polyethylene, epichlorohydrin rubber, chlorinated butyl rubber, and brominated butyl rubber.

6. The composition of claim 1 wherein each of said tackifiers is present at a concentration, in phr, selected from the group consisting of about 1 to about 20.

7. The composition of 6 wherein said tackifiers are present in substantially equal amounts.

8. The composition of claim 1, wherein said fluid permeation prevention layer has an air permeation coefficient of $25 \times 10^{-12}$ cc cm/cm$^2$ sec cmHg (at 30° C.) or less, and said at least one thermoplastic engineering resin of said polymer composition has an air permeation coefficient of $25 \times 10^{-12}$ cc-cm/cm$^2$ sec cmHg (at 30° C.) or less and said at least one elastomer of said polymer composition has an air permeation coefficient of more than $25 \times 10^{-12}$ cc-cm/cm$^2$ sec cmHg (at 30° C.) or less.

9. The composition of claim 1 suitable for use in a tire wherein said layer comprising at least one engineering resin is an innerliner layer and said layer comprising said high diene rubber is a carcass layer or sidewall layer or both.

10. A pneumatic tire comprising:
   i) an air permeation prevention layer comprising a polymer composition having an air permeation' coefficient of about $25 \times 10^{-12}$ cc- cm/cm$^2$ sec cmHg (at 30° C.) or less and a Young's modulus of about 1 to about 500 MPa, said layer of said polymer composition comprising:
   (A) at least 10% by weight, based on the total weight of the polymer composition, of at least one thermoplastic resin component having an air permeation coefficient of about $25 \times 10^{-12}$ cc cm/cm$^2$ sec cmHg (at 30° C.) or less and a Young's modulus of more than 500 MPa, the resin component is selected from the group consisting of polyamide resins, polyester resins, polynitrile resins, polymethacrylate resins, polyvinyl resins, cellulose resins, fluororesins, and imide resins, and
   (B) at least 10% by weight, based on the total weight of said polymer composition, of at least one elastomer component having an air permeation coefficient of more than about $25 \times 10^{-12}$ cc- cm/cm$^2$ sec cmHg (at 30° C.) and a Young's modulus of not more than 500 MPa, the elastomer component is selected from the group consisting of diene rubbers and the hydrogenates thereof, halogen-containing rubbers, silicone rubbers, sulfur-containing rubbers, fluoro-rubbers, hydrin rubbers, acryl 0 rubbers, ionomers and thermoplastic elastomers,
the total amount (A)+(B) of the component (A) and the component (B) being not less than about 30% by weight based on the total weight of said polymer composition, wherein the elastomer component (B) is dispersed in a vulcanized state, as a discontinuous phase, in a matrix of the thermoplastic resin component (A) in said polymer composition; (ii) a layer facing at least one surface of said air permeation prevention layer; and
- (iii) a tie layer superposed between said air permeation prevention layer and layer (ii) said tie layer comprising a mixture of:
- (1) about 60 to about 90 weight % of at least one halogenated isobutylene-containing elastomer;
- (2) about 10 to about 40 weight % of at least one high diene elastomer;
- (3) about 20 to about 50 weight % of at least one filler;
- (4) about 0 to about 30 weight % of at least one processing oil; (5) about 1 to about 20 parts per hundred (phr) of a tackifier mixture of at least one of rosin or rosin derivatives and a condensate of tert-butyl phenol and acetylene and wherein said at least two tackifiers are present at a weight ratio of one of the other of about 1 to about 10 to about 10 to about 1; and
- (6) about 0.1 to about 15 pads per hundred of rubber (phr) of a curing system for said elastomers; and wherein the amount and type of said at least one tackifier is effective to provide sufficient uncured adhesive strength to permit the building of said tire without substantial delamination of said tie layer to innerliner layer or said carcass element prior to the establishment of crosslinking in an amount to provide suitable adhesion between said layers in order to produce an acceptable tire.

11. A pneumatic tire as claimed in claim 10, wherein tie layer component (1) is (i) a halogen-containing random copolymer of a $C_4$ to $C_7$ isomonoolefin and a paralkylstyrene, said para-alkylstyrene comprising about 0.5 to about 20 weight percent of said copolymer, or (ii) a halogen-containing random copolymer of a $C_4$ to $C_{12}$ isomonoolefin and a $C_4$ to $Cl_4$ multiolefin; in each instance, said halogen selected from the group consisting of chlorine, bromine and mixtures thereof.

12. A pneumatic tire as claimed in claim 11 wherein said component (ii) is selected from the group consisting of chlorinated butyl rubber, brominated butyl rubber, chlorinated star branched butyl rubber, brominated star branched butyl rubber, chlorinated high triad fraction butyl rubber, brominated high triad fraction butyl rubber, chlorinated butyl rubber substantially free of long chain branching, brominated butyl rubber substantially free of long chain branching and mixtures thereof.

13. A pneumatic tire as claimed in claim 10 wherein tie layer component (2) is a natural or synthetic rubber comprising at least 50 mole % of diene monomer and selected from the group consisting of polyisoprene, polybutadiene, poly (styreneco-butadiene), poly (styrene-butadiene-styrene) block copolymer, natural rubber and mixtures thereof.

14. A pneumatic tire as claimed in claim 10 wherein said component (i) (A) is at least one polyamide resin, said component (i) (B) is at least one bromine-containing random elastoraeric copolymer of a $C_4$ to $C_7$ isomonoolefin and a para-alkylstyrene and said tie layer component (1) is (i) a bromine-containing random copolymer of a $C_4$ to $C_7$ isomonoolefin and a para-alkylstyrene.

\* \* \* \* \*

UNITED STATES PATENT AND TRADEMARK OFFICE
CERTIFICATE OF CORRECTION

PATENT NO.       : 8,580,877 B2
APPLICATION NO. : 12/091608
DATED            : November 12, 2013
INVENTOR(S)      : Tsou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1140 days.

Signed and Sealed this
Twenty-second Day of September, 2015

Michelle K. Lee
*Director of the United States Patent and Trademark Office*